United States Patent
Jeon et al.

(10) Patent No.: US 10,511,826 B2
(45) Date of Patent: Dec. 17, 2019

(54) 3D IMAGE SENSOR MODULE AND ELECTRONIC APPARATUS INCLUDING THE SAME

(71) Applicant: SAMSUNG ELECTRONICS CO., LTD., Suwon-si (KR)

(72) Inventors: Myungjae Jeon, Yongin-si (KR); Yonghwa Park, Yongin-si (KR); Jangwoo You, Seoul (KR); Heesun Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 81 days.

(21) Appl. No.: 15/883,437

(22) Filed: Jan. 30, 2018

(65) Prior Publication Data

US 2018/0176540 A1 Jun. 21, 2018

Related U.S. Application Data

(62) Division of application No. 14/734,592, filed on Jun. 9, 2015, now Pat. No. 9,918,071.

(30) Foreign Application Priority Data

Oct. 7, 2014 (KR) .......... 10-2014-0135122

(51) Int. Cl.
*G01C 3/08* (2006.01)
*H04N 13/207* (2018.01)
(Continued)

(52) U.S. Cl.
CPC ....... *H04N 13/207* (2018.05); *H04N 5/23241* (2013.01); *H04N 13/254* (2018.05); *H04N 13/271* (2018.05); *H04N 13/296* (2018.05)

(58) Field of Classification Search
CPC .......... H04N 13/0207; H04N 5/23241; H04N 13/0253; H04N 13/0271; H04N 13/0296
See application file for complete search history.

(56) References Cited

U.S. PATENT DOCUMENTS

2014/0055565 A1   2/2014 You et al.

FOREIGN PATENT DOCUMENTS

DE    10 2011 078 338 A1    1/2013
JP           4034412 B2        1/2008
(Continued)

OTHER PUBLICATIONS

Jan Ebert et al., "Class E High-Efficiency Tuned Power Oscillator", IEEE Journal of Solid-State Circuits, vol. SC-16, No. 2, Apr. 1981, pp. 62-66, XP001461922.
(Continued)

*Primary Examiner* — Samantha K Abraham
(74) *Attorney, Agent, or Firm* — Sughrue Mion, PLLC

(57) ABSTRACT

A three-dimensional (3D) image sensor device and an electronic apparatus including the 3D image sensor device are provided. The 3D image sensor device includes: a shutter driver that generates a driving voltage of a sine wave biased with a first bias voltage, from a loss-compensated recycling energy; an optical shutter that varies transmittance of reflective light reflected from a subject, according to the driving voltage, and modulates the reflective light to generate at least two optical modulation signals having different phases; and an image generator that generates 3D image data for the subject which includes depth information calculated based on a phase difference between the at least two optical modulation signals.

5 Claims, 29 Drawing Sheets

(51) Int. Cl.
*H04N 5/232* (2006.01)
*H04N 13/254* (2018.01)
*H04N 13/271* (2018.01)
*H04N 13/296* (2018.01)

(56) References Cited

FOREIGN PATENT DOCUMENTS

| | | |
|---|---|---|
| KR | 10-2011-0071555 A | 6/2011 |
| KR | 10-1082049 B1 | 11/2011 |

OTHER PUBLICATIONS

Paul Scherz, "Practical Electronics for Inventors", In Practical Electronics for Inventors, McGraw Hill, 2000 (626 Pages Total), XP055232920, DOI: 10.1036.0071389903.
Communication dated Feb. 29, 2016, from the European Patent Office in counterpart European Application No. 15177276.1.
Richard M. Conroy, et al., "A Power-Saving Modulation Technique for Time-of-Flight Range Imaging Sensors"; Proc. of SPIE, vol. 8085, 2011, 13 pgs.

3D IMAGE SENSOR MODULE AND ELECTRONIC APPARATUS INCLUDING THE SAME

RELATED APPLICATION

This is a Divisional of U.S. application Ser. No. 14/734,592 filed Jun. 9, 2015, which claims priority from Korean Patent Application No. 10-2014-0135122, filed on Oct. 7, 2014, in the Korean Intellectual Property Office, the entire contents of which are incorporated herein by reference.

BACKGROUND

1. Field

Apparatuses and methods consistent with exemplary embodiments relate to three dimensional (3D) image sensor modules and electronic apparatuses including the 3D image sensor modules.

2. Description of the Related Art

A sensor module for generating a three-dimensional (3D) image (or an apparatus including the sensor module) and depth information for a distance between subjects may be required to generate a 3D image. The depth information may be calculated by a method of measuring a time of flight (TOF) of light. In the case of using the method of measuring TOF, the depth information may be calculated by modulating light reflected from a subject.

However, a heat-related issue may arise due to electric power that is used to modulate the light reflected from a subject. The light reflected from a subject has to be accurately modulated to generate an image by using accurate depth information.

SUMMARY

Aspects of one or more exemplary embodiments provide three-dimensional (3D) image sensor modules for reducing power consumption or generating an accurate image.

Aspects of one or more exemplary embodiments provide electronic apparatuses including the 3D image sensor modules.

Additional aspects will be set forth in part in the description which follows and, in part, will be apparent from the description, or may be learned by practice of the presented exemplary embodiments.

According to an aspect of an exemplary embodiment, there is provided a 3D image sensor device including: a shutter driver configured to generate a driving voltage of a sine wave biased with a first bias voltage; an optical shutter configured to vary a transmittance of reflective light reflected from a subject, according to the driving voltage, and modulate the reflective light to generate at least two optical modulation signals having different phases; and an image generator configured to generate 3D image data corresponding to the subject which includes depth information determined based on a phase difference between the at least two optical modulation signals.

The shutter driver may include a resonator configured to resonate through an energy exchange with the optical shutter to generate the driving voltage; a loss compensator configured to provide energy to the resonator to compensate for energy lost during the energy exchange between the resonator and the optical shutter; and a first controller configured to control at least one selected from an amount of energy provided to the resonator by the loss compensator, and a time taken by the loss compensator to provide the energy to the resonator.

The resonator may include at least one inductor having a first end electrically connected to a first end of the optical shutter, and a second end electrically connected to the loss compensator; and at least one capacitor having a first end electrically connected to the second end of the inductor, and a second end electrically connected to a second end of the optical shutter, wherein the first bias voltage is applied to the second end of the at least one capacitor.

The loss compensator may include at least one inverter gated by a first control signal that is input from the first controller, wherein an output terminal of the at least one inverter is electrically connected to the resonator to provide energy to the resonator.

The resonator may include an inductor and a capacitor, and the output terminal of the at least one inverter may be connected to a first node to which the inductor and the capacitor are electrically connected.

The 3D image sensor device may include an output terminal of the at least one inverter that may be connected to a first terminal to which the optical shutter and the resonator are electrically connected.

The first controller may be configured to provide the first control signal to a gate of a p-type metal-oxide semiconductor (PMOS) and a gate of an n-type metal-oxide semiconductor (NMOS) transistor of the at least one inverter.

The first controller may include: an active signal generator configured to detect a voltage between a first terminal and a second terminal, to which the optical shutter and the resonator are electrically connected, and generate an active signal; and a first control signal output unit configured to, in response to receiving the active signal, provide the first control signal to the at least one inverter so that the output terminal of the at least one inverter is in a high impedance state.

The first controller may include: an active signal generator configured to generate an active signal based on environmental information for the 3D image sensor device; and a first control signal output unit configured to, in response to receiving the active signal, provide the first control signal to the at least one inverter so that the output terminal of the at least one inverter is in a high impedance state.

The first controller may be configured to provide the first control signal to a gate of a PMOS transistor of the at least one inverter and provide a second control signal to a gate of an NMOS transistor of the at least one inverter.

The duty ratios of the first control signal and the second control signal may be different from each other.

The loss compensator may include at least one half bridge circuit gated by a first control signal and a second control signal, the first control signal and the second control signal being input from the first controller, wherein an output terminal of the at least one half bridge circuit may be electrically connected to the resonator to provide energy to the resonator.

The shutter driver may further include a burst mode driver configured to output a burst signal for directing an operation of a burst mode, wherein the first controller may be configured to, in response to receiving the burst signal, provide a first control signal to the loss compensator maintained at a first logic level.

According to an aspect of another exemplary embodiment, there is provided a 3D image sensor device including: an optical shutter configured to vary a transmittance of reflective light reflected from a subject, according to a driving voltage of a sine wave biased with a first bias voltage, and modulate the reflective light to generate at least two optical modulation signals having different phases; a shutter driver configured to generate the driving voltage through an energy exchange between an LC resonant circuit and the optical shutter and provide the driving voltage to the optical shutter; and an image sensor configured to output at least two electrical signals, each of which corresponds to the at least two optical modulation signals, by units of frames.

The shutter driver may include: a loss compensator configured to provide energy to the LC resonant circuit to compensate for energy lost during the energy exchange between the LC resonant circuit and the optical shutter; and a first controller configured to control at least one selected from an amount of energy provided to the LC resonant circuit by the loss compensator, and a time taken by the loss compensator to provide the energy to the LC resonant circuit.

The loss compensator may include at least one inverter that may be gated by a first control signal input from the first controller and may be configured to provide energy to a first node electrically connected to the LC resonant circuit.

The 3D image sensor device may include a detector configured to provide a detection result to the shutter driver corresponding to environmental information of the 3D image sensor device, wherein the shutter driver may be configured to, in response to receiving the detection result, adjust a duty ratio of the first control signal and a level of a power supply voltage of the shutter driver.

The 3D image sensor device may include a burst mode driver configured to output a burst signal for directing an operation of a burst mode, wherein the shutter driver may be configured to, in response to receiving the burst signal, not generate the driving voltage in a period corresponding to a portion of the frame.

According to an aspect of another exemplary embodiment, there is provided a 3D image sensor device including: an optical shutter configured to vary a transmittance of reflective light reflected from a subject, according to a driving voltage of a sine wave biased with a first bias voltage, and modulate the reflective light to generate at least two optical modulation signals having different phases; a shutter driver configured to generate the driving voltage and provide the driving voltage to the optical shutter, the shutter driver including an inductor having a first end connected to the optical shutter, an inverter having an output terminal connected to a second end of the inductor, a first controller configured to provide a first control signal to a gate of the inverter, and a parasitic capacitor; and an image sensor configured to output at least two electrical signals, each of which corresponds to the at least two optical modulation signals, by units of frames.

According to an aspect of another exemplary embodiment, there is provided a 3D image sensor device including: an optical shutter configured to vary a transmittance of reflective light reflected from a subject, according to a driving voltage of a sine wave biased with a first bias voltage, and modulate the reflective light to generate at least two optical modulation signals having different phases; a shutter driver configured to generate the driving voltage and provide the driving voltage to the optical shutter, the shutter driver including an inductor having a first end connected to the optical shutter, an inverter having an output terminal connected to a second end of the inductor and including a transistor implemented with a built-in diode, and a first controller configured to provide a first control signal to a gate of the inverter; and an image sensor configured to output at least two electrical signals, each of which corresponds to the at least two optical modulation signals, by units of frames.

According to an aspect of another exemplary embodiment, there is provided a shutter driver for generating a driving voltage, the shutter driver including: a resonator configured to resonate by releasing and accumulating energy between an inductor and a capacitor; a loss compensator configured to provide energy to the resonator according to an energy lost in the resonator due to a parasitic resistance; and a controller configured to provide a control signal to the loss compensator corresponding to operating characteristics of the resonator and the loss compensator, wherein the resonator provides the driving voltage to an optical shutter.

The loss compensator may include at least one inverter, and the loss compensator may be connected to a power supply terminal at one end and a ground terminal at the other end; and in response to the control signal having a logic high level, a current path may be configured to flow from the power supply terminal to a node connected to the capacitor, and in response to the control signal having a logic low level, a current path may be configured to flow from the node connected to the capacitor to the ground terminal.

A bias voltage may be applied to one end of the capacitor.

The controller may further include an active signal generator and a first control signal output unit, wherein the active signal generator may be configured to receive the driving voltage from the resonator and provide an active signal to the first control signal output unit corresponding to the driving voltage.

The active signal generator may be configured to adjust a duty ratio of the active signal according to the driving voltage received.

According to an aspect of an exemplary embodiment, an electronic apparatus includes one or more of the 3D image sensor modules described above.

According to an aspect of an exemplary embodiment, an apparatus for measuring the subject includes one or more of the 3D image sensor modules described above.

BRIEF DESCRIPTION OF THE DRAWINGS

The above and/or other aspects will become apparent and more readily appreciated from the following description of one or more exemplary embodiments, taken in conjunction with the accompanying drawings in which.

DETAILED DESCRIPTION

Figure 1:
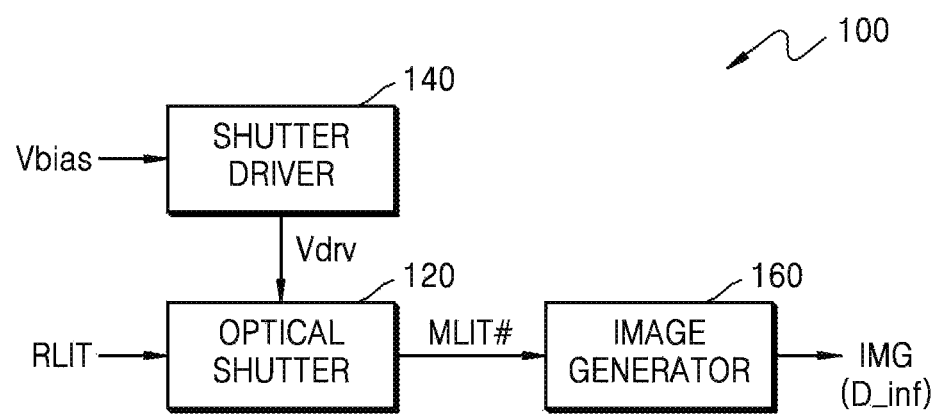
FIG. 1 is a block diagram illustrating a three-dimensional (3D) image sensor module according to an exemplary embodiment.

Reference will now be made in detail to one or more exemplary embodiments, illustrated in the accompanying drawings, wherein like reference numerals refer to like elements throughout. In this regard, exemplary embodiments may have different forms and should not be construed as being limited to the descriptions set forth herein. Accordingly, one or more exemplary embodiments are merely described below, by referring to the figures, to explain aspects of the present inventive concept.

FIG. 1 is a block diagram of a three-dimensional (3D) image sensor module 100 according to an exemplary embodiment.

Referring to FIG. 1, the 3D image sensor module 100 includes an optical shutter 120, a shutter driver 140, and an image generator 160. The 3D image sensor module 100 may be implemented as a single chip.

An optical shutter 120 may vary transmittance of reflective light RLIT reflected from a subject, according to a driving voltage Vdrv, and modulate the reflective light RLIT to generate at least two optical modulation signals MLIT# having different phases. For example, the optical shutter 120 may modulate the reflective light RLIT to generate four optical modulation signals MLIT# having phases of 0 degrees, 90 degrees, 180 degrees, and 270 degrees, respectively. The at least two optical modulation signals MLIT# may be simultaneously or sequentially output from the optical shutter 120.

Figure 2:
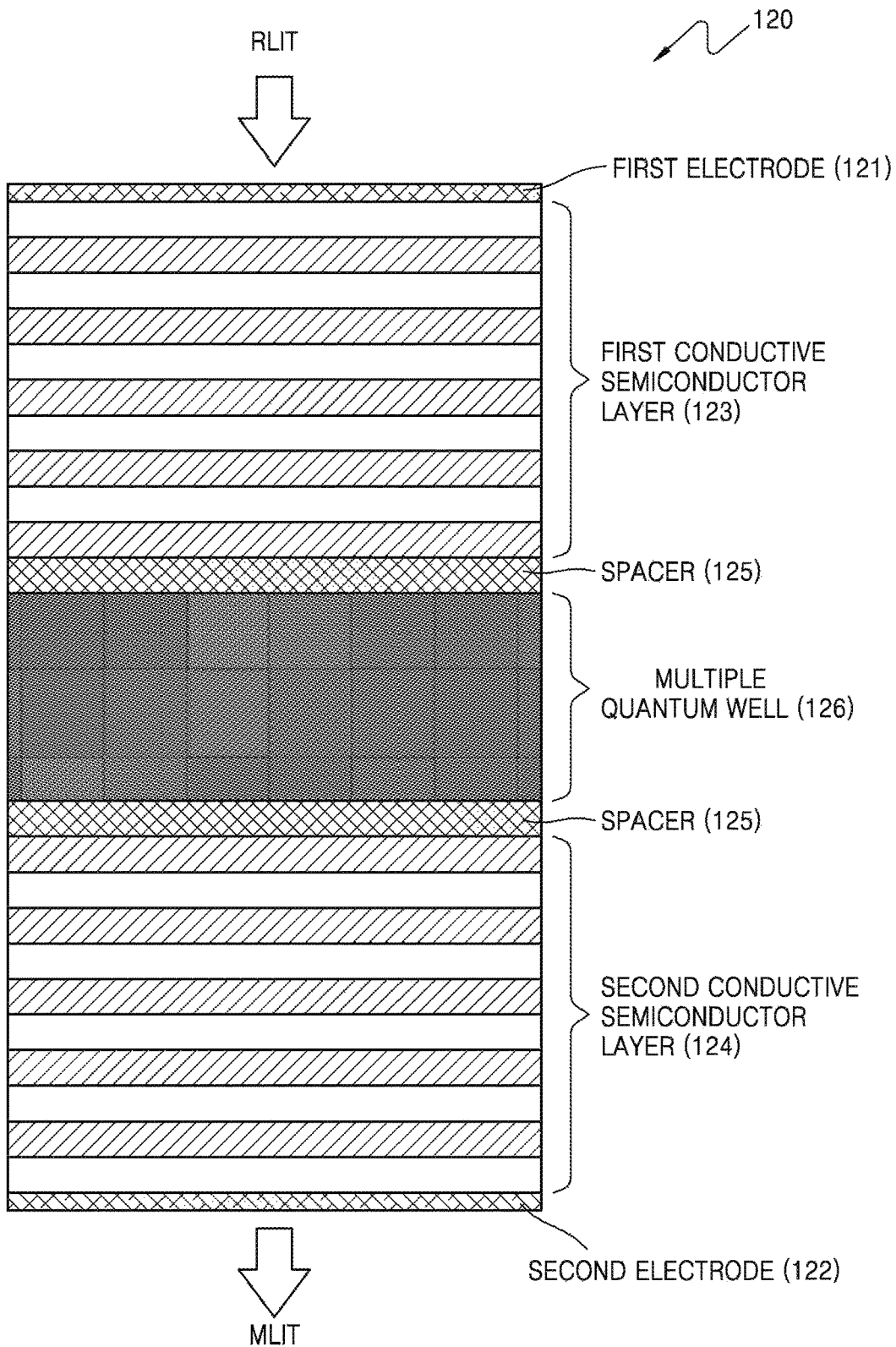
FIG. 2 is a diagram illustrating a structure of an optical shutter of FIG. 1, according to an exemplary embodiment.

FIG. 2 is a diagram illustrating a structure of an optical shutter 120 of FIG. 1, according to an exemplary embodiment, and FIGS. 3 through 6 are diagrams for explaining operating characteristics of an exemplary optical shutter of FIG. 2.

Referring to FIG. 2, an optical shutter 120 may include a first electrode 121, a second electrode 122, a first conductive semiconductor layer 123, a second conductive semiconductor layer 124, a spacer 125, and a multiple quantum well 126. However, the optical shutter 120 of FIG. 2 is only an example, and the 3D image sensor module 100 may include an optical shutter having a structure that is different from that of the optical shutter 120 of FIG. 2.

A driving voltage Vdrv is applied between the first electrode 121 and the second electrode 122. The first electrode 121 may be a p-type electrode, and the second electrode 122 may be an n-type electrode. As an example, the first conductive semiconductor layer 123 may be a p-type distributed Bragg rectifier (DBR), and the second conductive semiconductor layer 124 may be an n-type DBR. For example, the first conductive semiconductor layer 123 and the second conductive semiconductor layer 124 each may have a structure in which $Al_{0.31}GaAs$ and $Al_{0.84}GaAs$ are alternately stacked. A spacer 125 may be positioned between the first conductive semiconductor layer 123 and the multiple quantum well 126 and between the second conductive semiconductor layer 124 and the multiple quantum well 126. The spacer 125 may be formed of $Al_{0.31}GaAs$. The multiple quantum well 126 may be formed of GaAs or $Al_{0.31}GaAs$.

Figure 3:
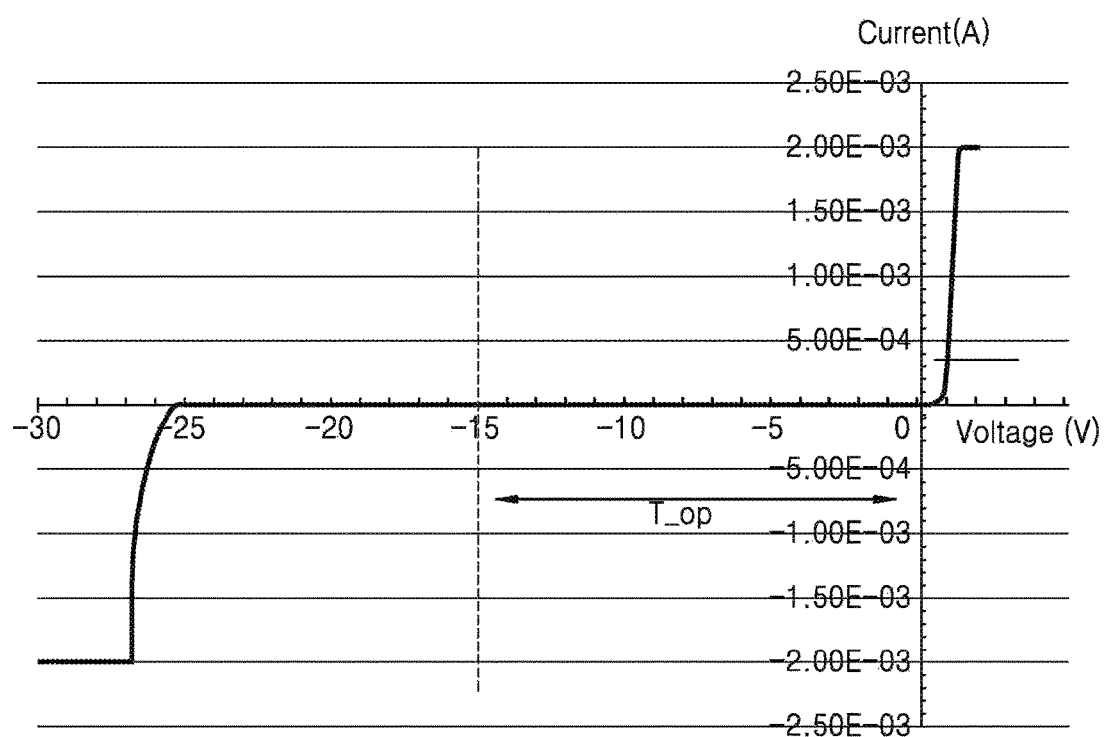
FIGS. 3 through 6B are diagrams illustrating operating characteristics of an optical shutter of FIG. 2.

The first conductive semiconductor layer 123 and the second conductive semiconductor layer 124 may operate as a pair of resonating mirrors, and the multiple quantum well 126 may perform electro-absorption and thus may function as a resonance cavity. A reverse bias voltage Vdrv (i.e., the driving voltage Vdrv of FIG. 1) is applied between the first electrode 121 and the second electrode 122, as illustrated in FIG. 3. FIG. 3 illustrates operating characteristics of an exemplary optical shutter 120 of FIG. 2 in which light absorption (electro-absorption) in the multiple quantum well 126 is controlled with a reverse bias voltage having a voltage level belonging to a section T_op of 0 volts to −15 volts.

Figure 4:
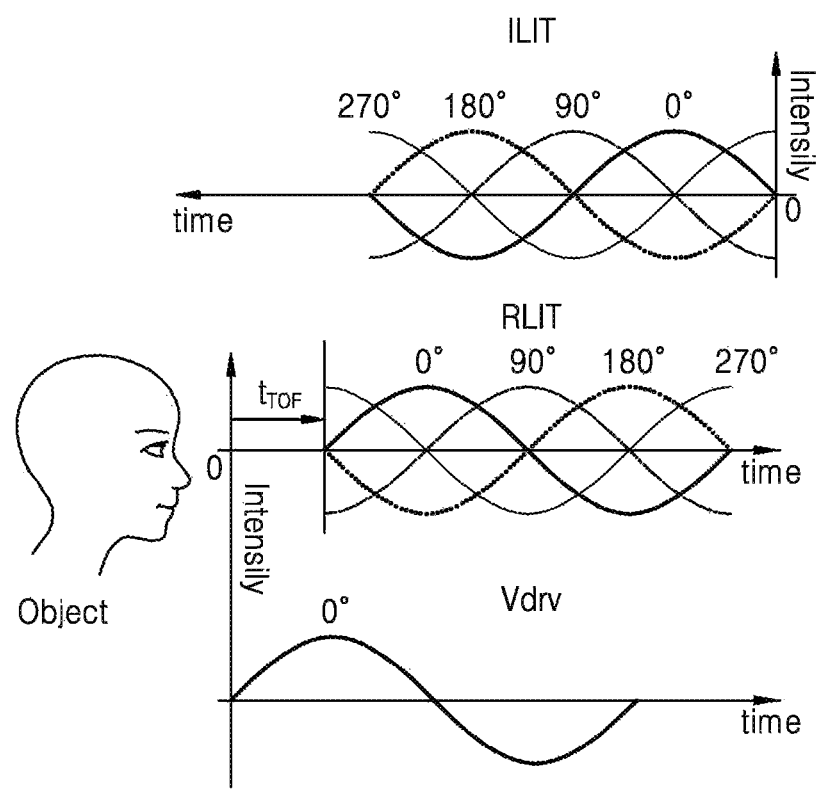
Figure 5:
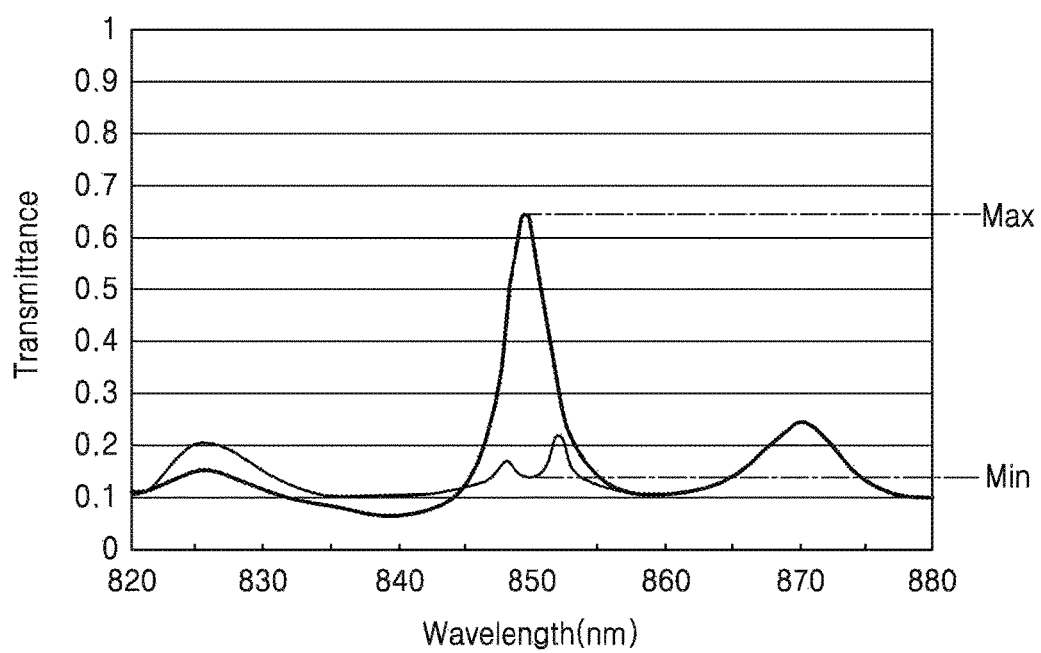

According to a reverse bias voltage having a voltage level between 0 volts and −15 volts, the reflective light RLIT is modulated differently and thus the at least two optical modulation signals MLIT# may be output, as shown in FIG. 4. Referring to FIG. 4, when incident light ILIT having a certain wavelength (e.g., near infrared (NIR) 850 nm) is phase-modulated through a light source (e.g., light-emitting diode (LED) or laser diode (LD)) and phase-modulated incident light ILIT is projected onto a subject, reflective light RLIT reflected from the subject, which has the same wavelength as the incident light ILIT, is received by an optical shutter 120. The light source may phase-modulate the incident light by 0 degrees, 90 degrees, 180 degrees, and 270 degrees and project the phase-modulated incident light onto the subject. In this case, the optical shutter 120 may vary a voltage level of the reverse bias voltage and phase-modulate the reflective light RLIT by 0 degrees, 90 degrees, 180 degrees, and 270 degrees to output the at least two optical modulation signals MLIT#. As described above, the optical shutter 120 may simultaneously or sequentially output optical modulation signals MLIT# phase-modulated by 0 degrees, 90 degrees, 180 degrees, and 270 degrees. If the 3D image sensor module 100 includes multiple optical shutters that are the same as an optical shutter 120 of FIG. 2, at least two optical modulation signals MLIT# may be simultaneously output. On the contrary, if the 3D image sensor module 100 includes only one optical shutter that is the same as an optical shutter 120 of FIG. 2, at least two optical modulation signals MLIT# may be sequentially output In an optical shutter 120, the transmittance of the reflective light RLIT is significantly changed according to a voltage level of the reverse bias voltage at a certain wavelength (e.g., NIR 850 nm), as illustrated in FIG. 5. In an optical shutter 120, a voltage level (i.e., voltage level between 0 volts and −15 volts of FIG. 3) of the reverse bias voltage (driving voltage) may be set so as to transmit the reflective light RLIT by using a transmittance value corresponding to phase modulation of 0 degrees, 90 degrees, 180 degrees, and 270 degrees, selected from transmittance values between a maximum value Max and a minimum value Min of FIG. 5.

Figure 6A:
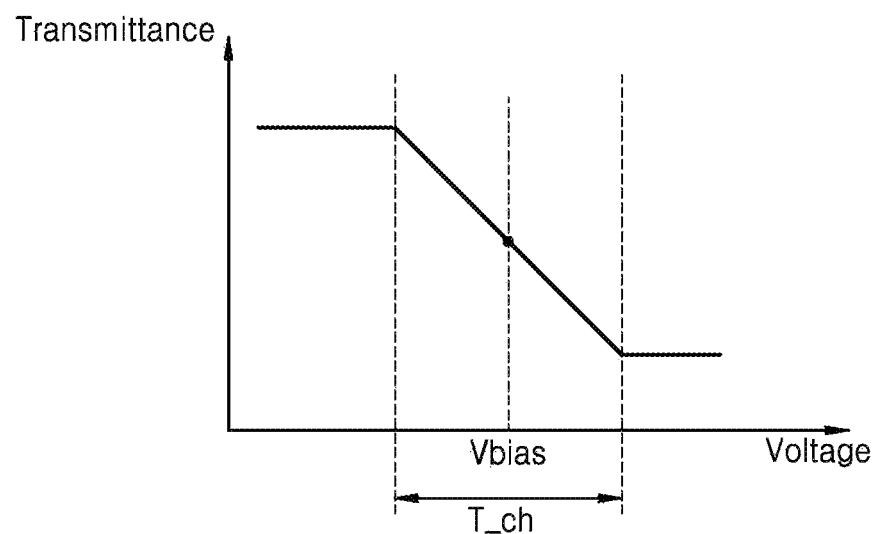
Figure 6B:
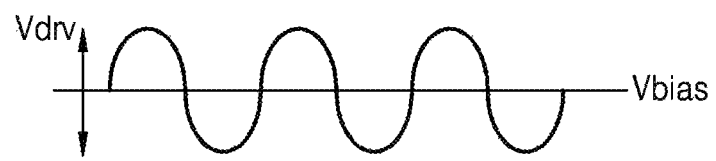

Characteristics of an optical shutter 120 are illustrated in FIG. 6A. Referring to FIG. 6A, in a section T_ch (between the maximum value Max and the minimum value Min of FIG. 5), transmittance is changed according to a voltage with respect to a certain wavelength. Accordingly, the driving voltage Vdrv has to swing within the section T_ch to vary a phase by adjusting transmittance according to the driving voltage Vdrv. The driving voltage Vdrv is generated as a sine wave biased with a bias voltage Vbias, as illustrated in FIG. 6B. The bias voltage Vbias may be a central value of a certain voltage section, i.e., the section T_ch.

Referring back to FIG. 1, the shutter driver 140 generates the driving voltage Vdrv of the sine wave biased with the bias voltage Vbias from a loss-compensated recycling energy and applies the generated driving voltage Vdrv to an optical shutter 120.

Figure 7:
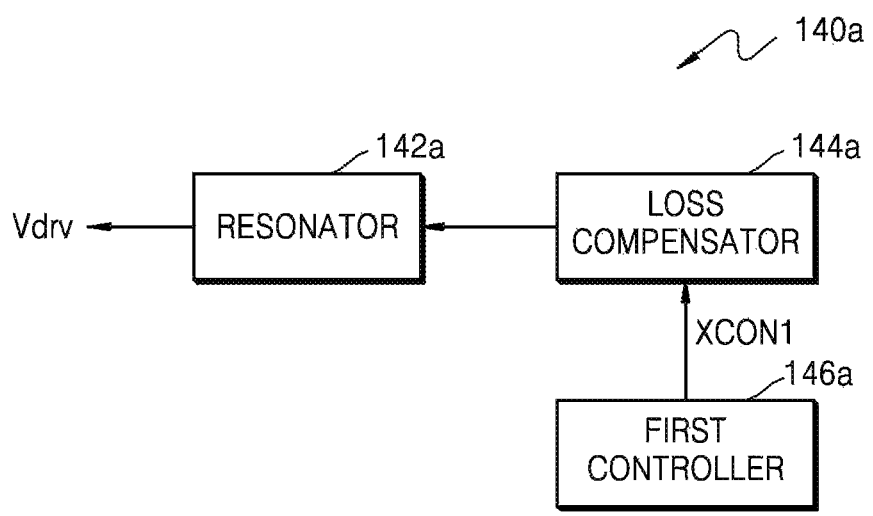
FIG. 7 is a block diagram of a shutter driver according to an exemplary embodiment.

FIG. 7 is a block diagram of a shutter driver 140a, which corresponds to a shutter driver 140 of FIG. 1, according to an exemplary embodiment.

Referring to FIGS. 1 and 7, a shutter driver 140a may include a resonator 142a, a loss compensator 144a, and a first controller 146a. The resonator 142a may resonate through energy exchange with the optical shutter 120 to thereby generate a driving voltage Vdrv. For example, the resonator 142a may resonate through repetition of transient energy release and accumulation between an inductor and a capacitor. Energy accumulated in the capacitor of the resonator 142a may be applied to the optical shutter 120 through the inductor of the resonator 142a, or energy supplied from the optical shutter 120 may be accumulated in the capacitor of the resonator 142a. Since the optical shutter 120 may be equivalently converted into a resistor and a capacitor, energy exchange with the optical shutter 120 may be performed in a resonance process of the resonator 142a. Power consumption that is required when the resonator 142a generates the driving voltage Vdrv is relatively low, compared to a linear power amplifier. Accordingly, the 3D image sensor module 100 in which the driving voltage Vdrv is generated by the shutter driver 140a may reduce power consumption.

The loss compensator 144a may apply energy, which corresponds to energy lost due to a parasitic resistance of an electrical wire during energy exchange between a resonator 142a and an optical shutter 120, to a resonator 142a. The first controller 146a may control at least one selected from the amount of energy (which is applied to the resonator 142a by the loss compensator 144a) and a time for which the loss compensator 144a applies the energy to the resonator 142a.

Figure 8:
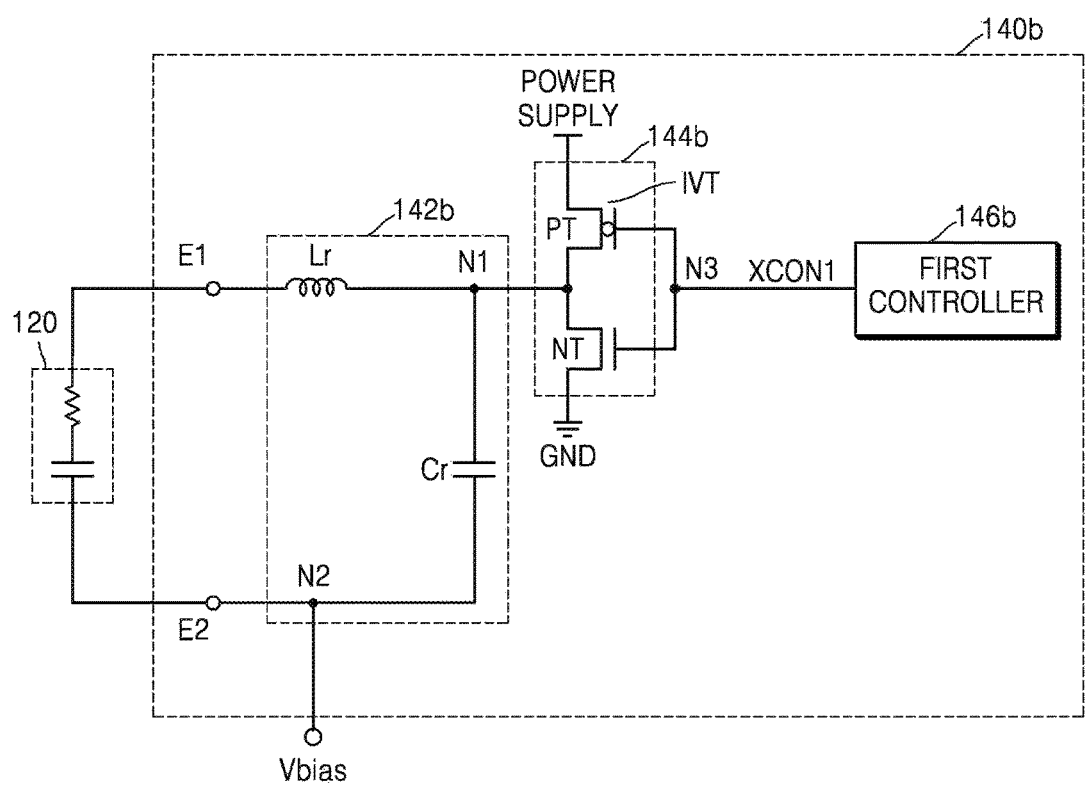
FIG. 8 is a diagram illustrating a shutter driver according to another exemplary embodiment.

FIG. 8 is a diagram illustrating a shutter driver 140b, which corresponds to a shutter driver 140 of FIG. 1, according to another exemplary embodiment. One optical shutter 120 is illustrated in FIG. 8, but multiple optical shutters may also be provided. Similarly, an image sensor module according to another exemplary embodiment to be described later may also include one or more optical shutters. Referring to FIG. 8, a shutter driver 140b may include a resonator 142b, a loss compensator 144b, and a first controller 146b, which perform operations that are similar to those explained with reference to FIG. 7.

To perform the operations that are similar to those explained with reference to FIG. 7, the resonator 142b of FIG. 8 may include an inductor Lr having one end electrically connected to one end (terminal E1) of an optical shutter 120 and the other end (a first node N1) electrically connected to a loss compensator 144b, and a capacitor Cr having one end electrically connected to the other end of the inductor Lr (first node N1) and the other end (a second node N2) electrically connected to the other end of an optical shutter 120. A bias voltage Vbias is applied to the other end (the second node N2) of the capacitor Cr. As described above, an optical shutter 120 may be equivalently represented by a resistor and a capacitor. A driving voltage Vdrv may be generated as a voltage between the terminal E1 and a terminal E2 which are connected to the optical shutter 120.

The loss compensator 144b may be electrically connected to the resonator 142b at the first node N1 and electrically connected to the first controller 146b at a node N3. The loss compensator 144b may supply energy to the first node N1 electrically connected to the resonator 142b, in response to a first control signal XCON1 that is input from the first controller 146b. For example, when energy is moved from the capacitor Cr to the optical shutter 120 through the inductor Lr or energy is moved from the optical shutter 120 to the capacitor Cr through the inductor Lr, the loss compensator 144b may supply energy to the resonator 142b.

To this end, the loss compensator 144b may include at least one inverter IVT that is connected between a power supply terminal and a ground terminal (GND) and is gated by the first control signal XCON1. A p-type metal-oxide semiconductor (PMOS) transistor PT of the inverter IVT may be turned on by the first control signal XCON1 at a logic low level, and thus, a current path may be formed from the power supply terminal to the first node N1. An n-type metal-oxide semiconductor (NMOS) transistor NT of the inverter IVT may be turned on by the first control signal XCON1 at a logic high level, and thus, a current path may be formed from the first node N1 to the ground terminal. Accordingly, an energy loss caused by an energy exchange process of the resonator 142b may be compensated.

As described above, the first control signal XCON1 may be output by the first controller 146b. The first control signal XCON1 may be generated to have a period adaptively set with respect to characteristics of the resonator 142b and characteristics of the loss compensator 144b, and to have a logic low voltage level and a logic high voltage level for each period. In this manner, as the shutter driver 140b includes the resonator 142b having a structure in which relatively low power is required to generate the driving voltage Vdrv, and compensates for energy lost in the resonator 142b, the shutter driver 140b may reduce power consumption while generating an accurate driving voltage Vdrv.

Figure 9A:
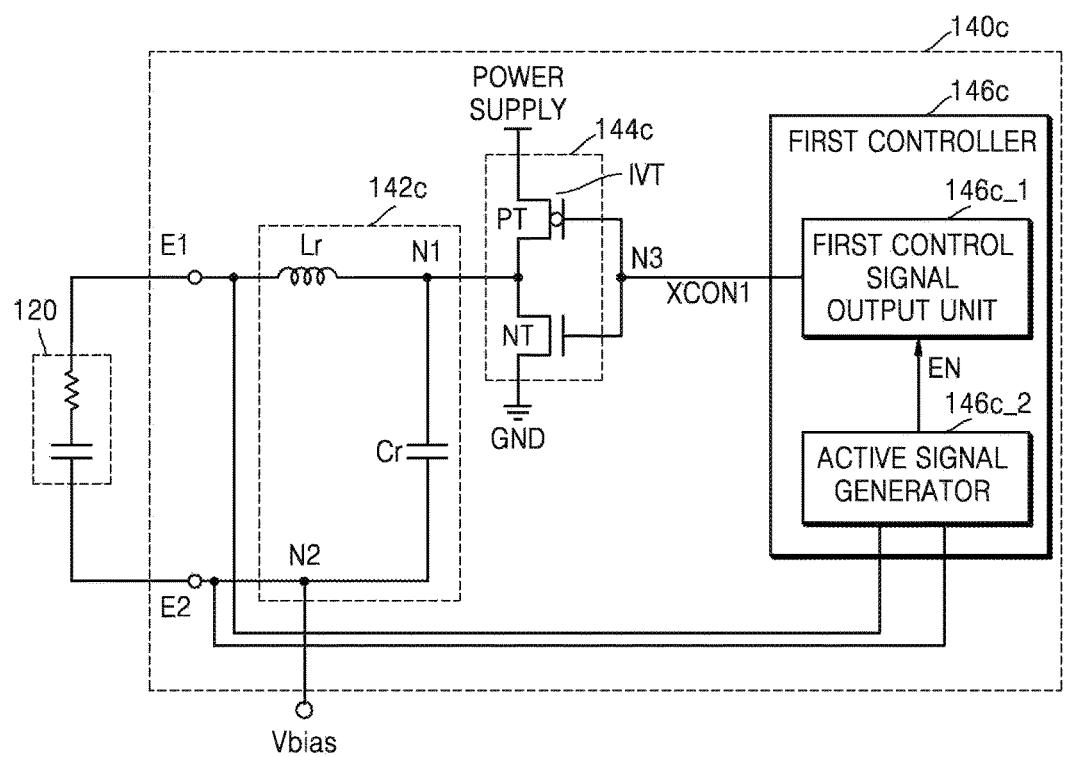
FIG. 9A is a diagram illustrating a shutter driver according to another exemplary embodiment.

FIG. 9A is a diagram illustrating a shutter driver 140c, which corresponds to a shutter driver 140 of FIG. 1, according to another exemplary embodiment.

Figure 9B:
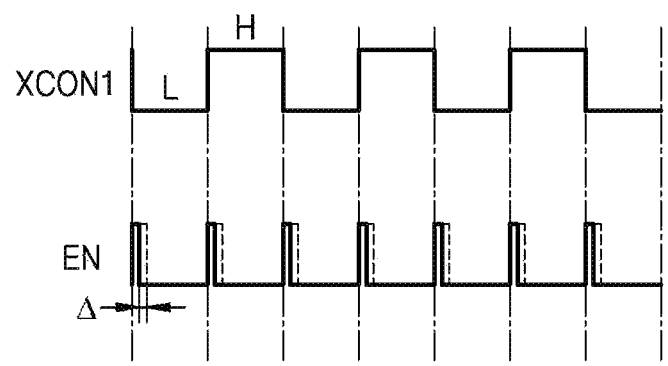
FIG. 9B is a diagram illustrating an operation of an exemplary first controller of FIG. 9A.

Referring to FIG. 9A, shutter driver 140c may include a resonator 142c, a loss compensator 144c, and a first controller 146c. The first controller 146c of FIG. 9A may include a first control signal output unit 146c_1 and an active signal generator 146c_2. The first controller 146c may apply a first control signal XCON1 to the loss compensator 144c in response to an active signal EN that is applied from the active signal generator 146c_2. For example, when the active signal EN at a logic high level is transmitted to the first control signal output unit 146c_1, the first control signal XCON1, as shown in FIG. 9B, may be applied to the loss compensator 144c.

When the active signal EN at a logic low level is transmitted to the first control signal output unit 146c_1, an output terminal of an inverter IVT of FIG. 9A has a high impedance state. When a current path is formed from a power supply terminal to a first node N1 to compensate for an energy loss in the resonator 142 by using the loss compensator 144c, a voltage between a terminal E1 and a terminal E2 may be distorted at a positive peak of the driving voltage Vdrv. The active signal generator 146c_2 of the first controller 146c may receive the voltage (i.e., the driving voltage Vdrv) between the terminal E1 and the terminal E2 and generate the active signal EN. The active signal generator 146c_2 may detect the voltage between the terminal E1 and the terminal E2 and vary a duty ratio of the active signal EN (refer to FIG. 9B) so that the driving voltage Vdrv may drive the optical shutter 120 at an optimum driving point.

For example, when distortion occurs at a peak of the driving voltage Vdrv, the active signal generator 146c_2 may adjust the duty ratio of the active signal EN to thereby generate the active signal EN having an adjusted duty ratio. In this manner, as the shutter driver 140c includes the resonator 142c having a structure in which relatively low power is required to generate the driving voltage Vdrv, and compensates for distortion while supplementing energy lost in the resonator 142c, the shutter driver 140c may reduce power consumption while generating an accurate driving voltage Vdrv.

Figure 10:
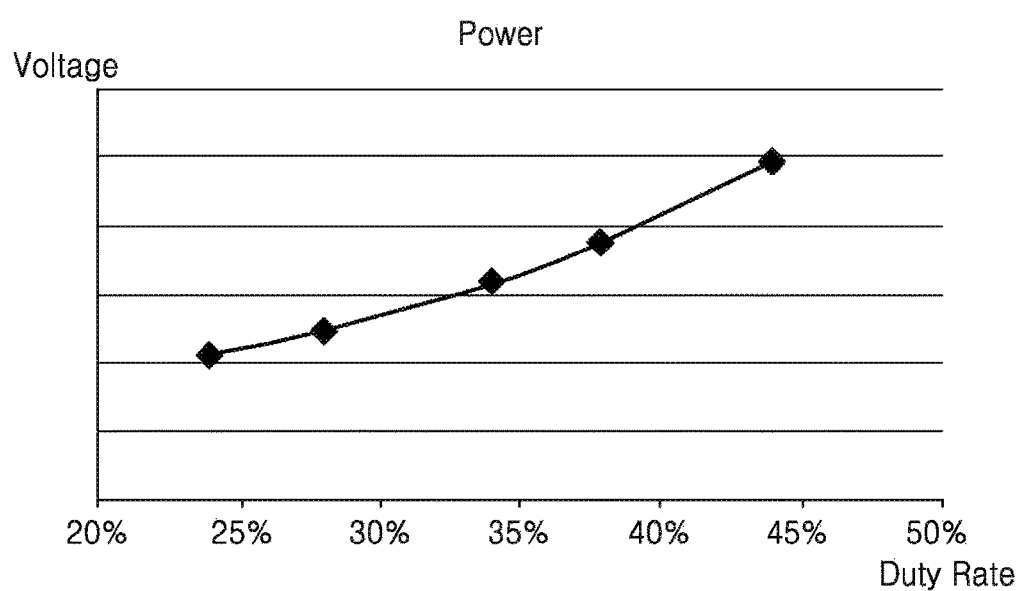
FIG. 10 is a graph illustrating a power reduction effect by an exemplary shutter driver of FIG. 9A.

In addition, the active signal generator 146c_2 may adjust the duty ratio of the active signal EN according to operating characteristics that are required in a 3D image sensor module 100. When the duty ratio of the active signal EN is reduced, an active period of a logic high and a logic low level of the first control signal XCON1 may be reduced. Accordingly, when the duty ratio of the active signal EN decreases, power consumption may be reduced as shown in simulation data of FIG. 10. On the contrary, when the duty ratio of the active signal EN increases, a resonance rate between the resonator 142c and the optical shutter 120 may increase. Accordingly, the 3D image sensor module 100 according to an exemplary embodiment may perform an optimum operation by varying the duty ratio according to a required driving condition.

Although the active signal generator 146c_2 of FIG. 9A is directly connected to the terminals E1 and E2, the disclosure is not limited thereto. For example, the active signal generator 146c_2 might not be connected to the terminals E1 and E2, and might receive the driving voltage Vdrv detected by a detector and perform the control operation described above. In addition, the active signal generator 146c_2 might adjust the duty ratio of the active signal EN based on environmental information C_inf of the 3D image sensor module 100, which will be described later. That is, a duty ratio of the first control signal XCON1 may be set differently based on environmental information C_inf of the 3D image sensor module 100.

Figure 11:
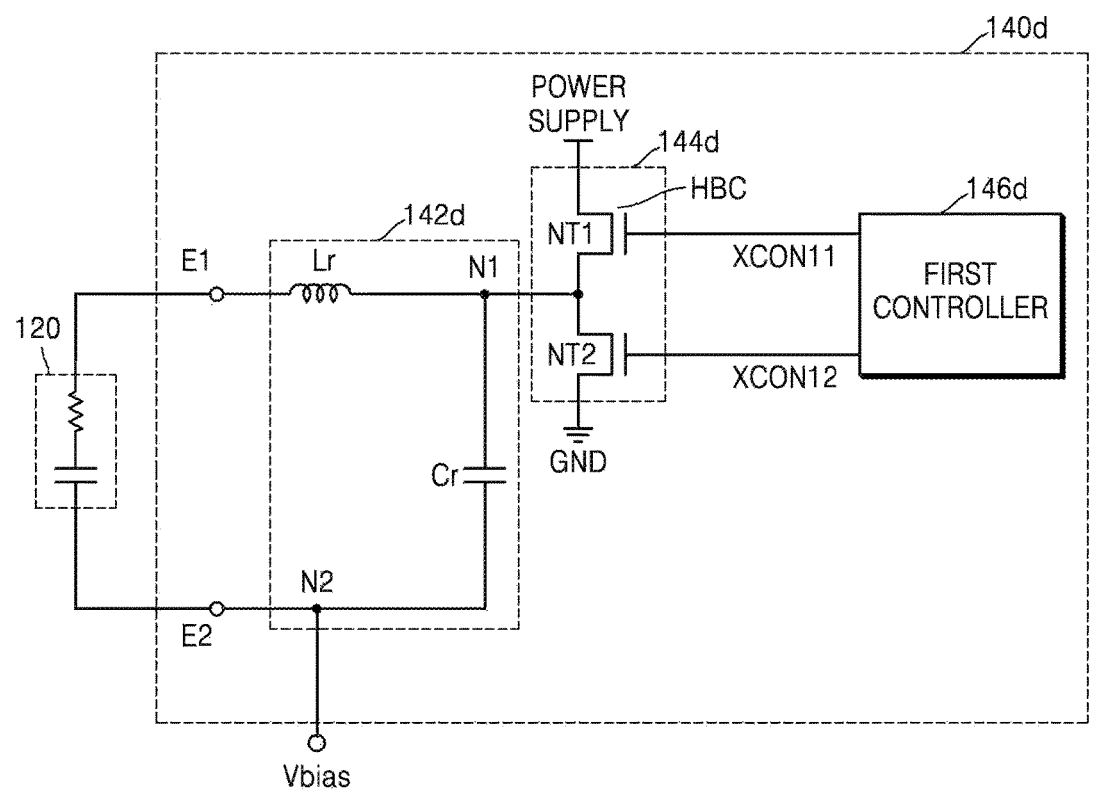
FIG. 11 is a diagram illustrating a shutter driver according to another exemplary embodiment.

FIG. 11 is a diagram illustrating a shutter driver 140d, which corresponds to the shutter driver 140 of FIG. 1, according to another exemplary embodiment.

Referring to FIG. 11, the shutter driver 140d may include a resonator 142d, a loss compensator 144d, and a first controller 146d. The structure and function of resonator 142d are as described above with reference to 142b of FIG. 8, and thus, an explanation thereof is omitted. The loss compensator 144d may operate in response to a pair of control signals XCON11 and XCON12 that are input from the first controller 146d, and may include a half bridge circuit (HBC) having an output terminal connected to a first node N1. For example, when the shutter driver 140d operates with a high voltage, the loss compensator 144d may be implemented with the HBC. FIG. 11 illustrates an example in which the HBC is implemented with two NMOS transistors, i.e., NT1 and NT2, which are connected in series between a power supply terminal and a ground terminal. However, the inventive concept is not limited thereto. For example, the HBC may be implemented with a different number of NMOS transistors or with PMOS transistors. The first controller 146d may apply control signal XCON11 to the first NMOS transistor NT1 having one terminal connected to the power supply terminal and may apply control signal XCON12 to the second NMOS transistor NT2 having one terminal connected to the ground terminal.

Figure 12:
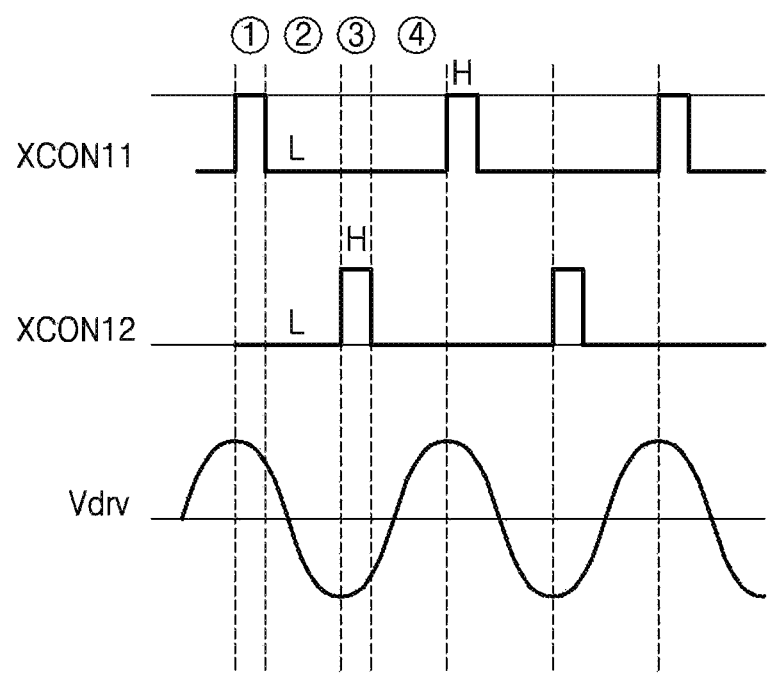
FIG. 12 is a diagram illustrating an exemplary pair of first control signals for controlling a half bridge circuit (HBC) of FIG. 11.

FIG. 12 is a diagram illustrating an example of the pair of control signals XCON11 and XCON12 for controlling the HBC of FIG. 11.

Referring to FIGS. 11 and 12, when the control signal XCON11 for gating the first NMOS transistor NT1 transitions to a logic high (H), the control signal XCON12 for gating the second NMOS transistor NT2 maintains a logic low (L). When the control signal XCON12 transitions to a logic high (H), the control signal XCON11 maintains a logic low (L). In a period in which the control signal XCON11 is at a logic high H and the control signal XCON12 is at a logic low L, the first NMOS transistor NT1 is turned on and the second NMOS transistor NT2 is turned off, and thus, a current path may be formed from the power supply node to the first node N1. In a period in which the first control signal XCON12 is at a logic high H and the first control signal XCON11 is at a logic low L, the second NMOS transistor NT2 is turned on and the first NMOS transistor NT1 is turned off, and thus, a current path may be formed from the first node N1 to the ground terminal.

Specifically, in a period ①, in which the control signal XCON11 is at a logic high H and the control signal XCON12 is at a logic low L, energy charged in the optical shutter 120 moves to a capacitor Cr and energy is supplied to the capacitor Cr as the first NMOS transistor NT1 is turned on when the voltage of the first node N1 is at peak. In a period ②, in which both the control signal XCON11 and the control signal XCON12 are at a logic low L, the first NMOS transistor NT1 is turned off and energy charged in the capacitor Cr moves to the optical shutter 120 through an inductor Lr. Then, in a period ③, in which the control signal XCON11 is at a logic low L and the control signal XCON12 is at a logic high H, the first node N1 maintains a ground voltage as the second NMOS transistor NT2 is turned on when the voltage of the optical shutter 120, that is, the driving voltage Vdrv, is at peak. Next, in a period ④, in which both the control signal XCON11 and the control signal XCON12 are at a logic high L, the second NMOS transistor NT2 is turned off and energy charged in the optical shutter 120 moves to the capacitor Cr through the inductor Lr. Through operations described above, a driving voltage Vdrv that is a voltage between the terminal E1 and the terminal E2 may be generated in the form of a sine wave as shown in FIG. 12 without an energy loss.

Figure 13A:
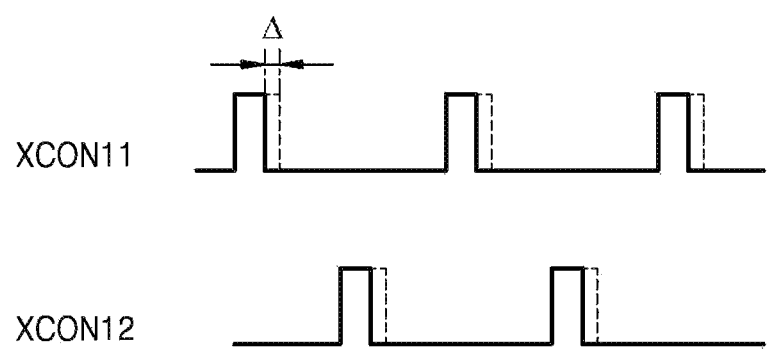
FIG. 13A is a diagram illustrating another exemplary pair of first control signals for controlling the HBC of FIG. 11.

FIG. 13A is a diagram illustrating another example of a pair of control signals XCON11 and XCON12 for controlling the HBC of FIG. 11.

Duty ratios of the pair of control signals XCON11 and XCON12 of FIG. 13 may be set differently from those of the pair of control signals XCON11 and XCON12 of FIG. 12 to prevent the occurrence of distortion at a peak of the driving voltage Vdrv by adjusting the amount of current supply from the power supply terminal to the first node N1 or the amount of current supply from the first node N1 to the ground terminal, or to generate the driving voltage Vdrv optimized for the operating characteristics of the 3D image sensor module 100, as explained with reference to FIGS. 9A and 9B. FIG. 13A illustrates a case in which the duty ratios of the pair of control signals XCON11 and XCON12 increase. However, the inventive concept is not limited thereto. For example, according to a waveform of the driving voltage Vdrv between the terminal E1 and the terminal E2, only the duty ratio of one of the pair of control signals XCON11 and XCON12 might increase or decrease, or all the duty ratios of the pair of control signals XCON11 and XCON12 might decrease.

Figure 13B:
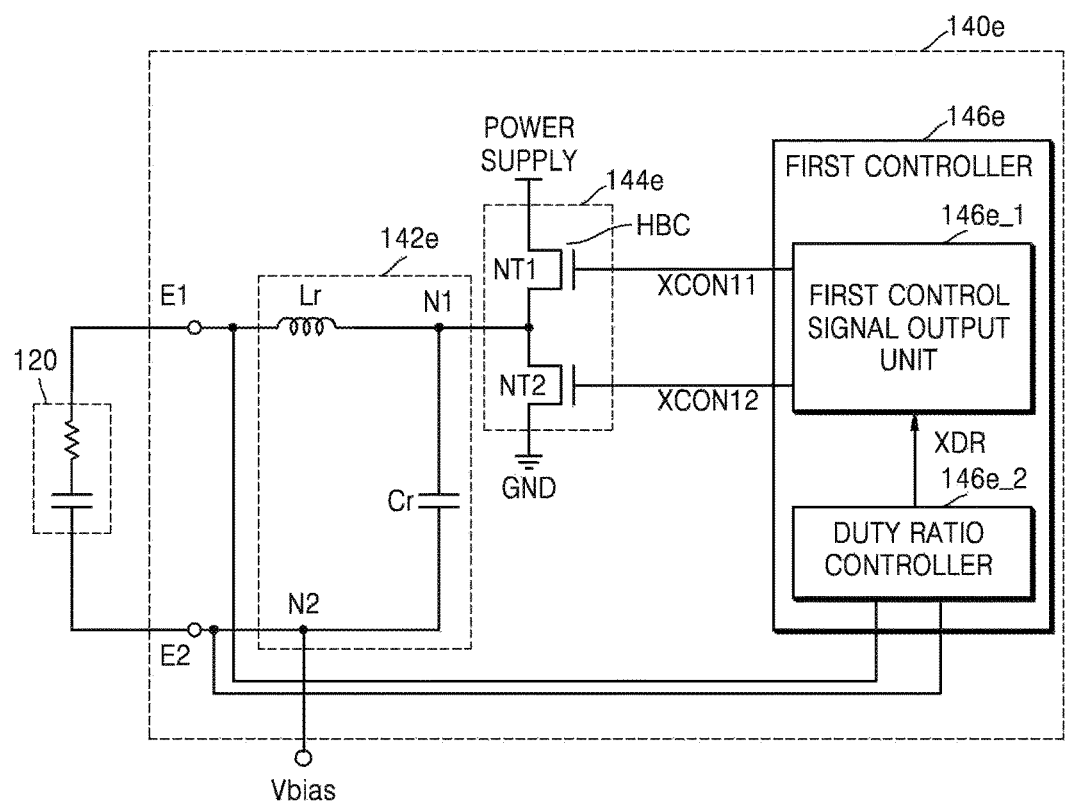
FIG. 13B is a diagram illustrating a shutter driver according to another exemplary embodiment.

FIG. 13B is a diagram illustrating a shutter driver 140e, which corresponds to a shutter driver 140 of FIG. 1, according to another exemplary embodiment.

In order to adjust duty ratios of a pair of first control signals XCON11 and XCON12, a first controller 146e illustrated in FIG. 13B may include a first control signal output unit 146e_1 and a duty ratio controller 146e_2. The first control signal output unit 146e_1 may apply the first control signal XCON11 to a first NMOS transistor NT1 and apply the first control signal XCON12 to a second NMOS transistor NT2. In this case, the duty ratios of the first control signals XCON11 and XCON12 may be adjusted in response to a duty ratio control signal XDR that is applied from the duty ratio controller 146e_2. The duty ratio controller 146e_2 may detect a driving voltage Vdrv to thereby generate the duty ratio control signal XDR.

Although the duty ratio controller 146e_2 of FIG. 13B is directly connected to terminals E1 and E2, the disclosure is not limited thereto. The duty ratio controller 146e_2 might not be connected to the terminals E1 and E2, and might receive the driving voltage Vdrv detected by a detector and perform the control operation described above. In addition, the duty ratio controller 146e_2 may generate the duty ratio control signal XDR based on environmental information C_inf of the 3D image sensor module 100, which will be described later. That is, the duty ratios of the pair of first control signals XCON11 and XCON12 may be set differently based on the environmental information C_inf of the 3D image sensor module 100.

Figure 14:
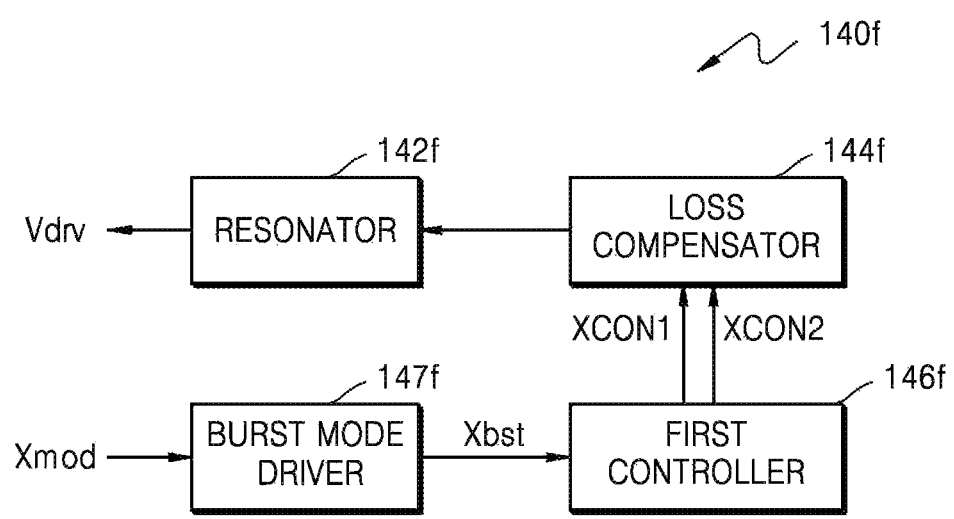
FIG. 14 is a block diagram of a shutter driver according to another exemplary embodiment.

FIG. 14 is a block diagram of a shutter driver 140f according to another exemplary embodiment.

Figure 15:
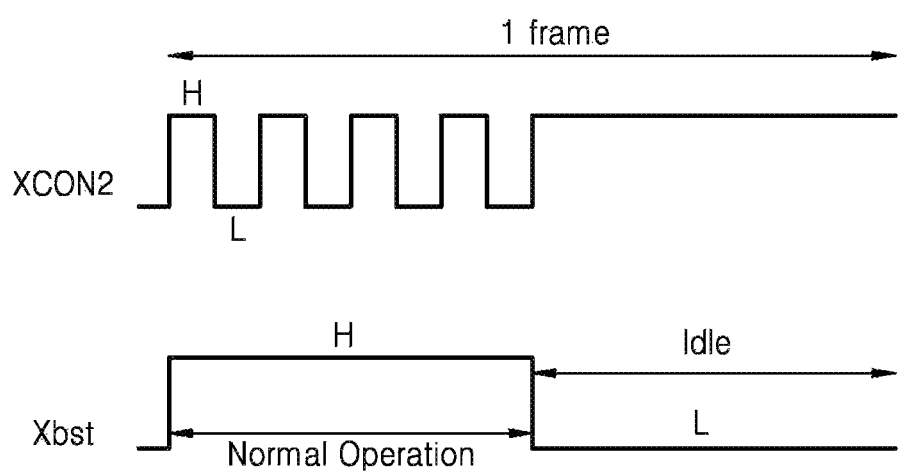
FIG. 15 is a diagram illustrating an operation of an exemplary shutter driver of FIG. 14.

Referring to FIG. 14, the shutter driver 140f may include a resonator 142f, a loss compensator 144f, and a first controller 146f. The resonator 142f, the loss compensator 144f, and the first controller 146f may be similar to those described above with reference to FIG. 8, and thus, detailed explanations thereof are omitted. The shutter driver 140f may further include a burst mode driver 147f. The burst mode driver 147f outputs a burst signal Xbst for initiating an operation of a burst mode. The burst mode is a mode in which an operation of the shutter driver 140f for generating a driving voltage Vdrv for one frame is performed only in a partial period of the frame, as illustrated in FIG. 15. The burst mode may be initiated in a case in which a signal sensed in a partial period by an image sensor (to be described later) is enough to generate one frame, a case in which it is necessary to reduce exposure to ambient light, and a case in which it is required to prevent additional power consumption.

The burst mode driver 147f may generate the burst signal Xbst in response to a mode signal Xmod that is applied from the outside. For example, when the mode signal Xmod at a logic high (H) level is applied to the burst mode driver 147f, the shutter driver 140f performs a normal operation for supplying the driving voltage Vdrv to the optical shutter 120. On the other hand, when the mode signal Xmod at a logic low (L) level is applied to the burst mode driver 147f, the shutter driver 140f enters an idle state. That is, the shutter driver 140f does not generate the driving voltage Vdrv, and thus, the 3D image sensor module 100 may be in the idle state.

The burst signal Xbst corresponding to the burst mode Xmod may be input to the first controller 146f. The first controller 146f may generate a second control signal XCON2 in response to the burst signal Xbst. The second control signal XCON2 may be transmitted to the loss compensator 144f. For example, in response to the second control signal XCON2 generated as shown in FIG. 15, an NMOS transistor NT of an inverter IVT of the loss compensator 144f may maintain a turn-on state, and thus, a first node N1 may be connected to a ground terminal. In this manner, as the shutter driver 140f includes the burst mode driver 147f, the shutter driver 140f operates only in a partial period of a frame, thereby reducing power consumption. In FIG. 14, the first control signal XCON1 and the second control signal XCON2 are illustrated as separate signals. However, the disclosure is not limited thereto. For example, in a burst mode, the first controller 146f might not generate the second control signal XCON2 and may maintain a logic level of the first control signal XCON1, which controls the inverter IVT of the loss compensator 144f during a normal operation, at a logic high (H) level.

The burst mode driver 147f may be disposed inside or outside the shutter driver 140f.

Figure 16:
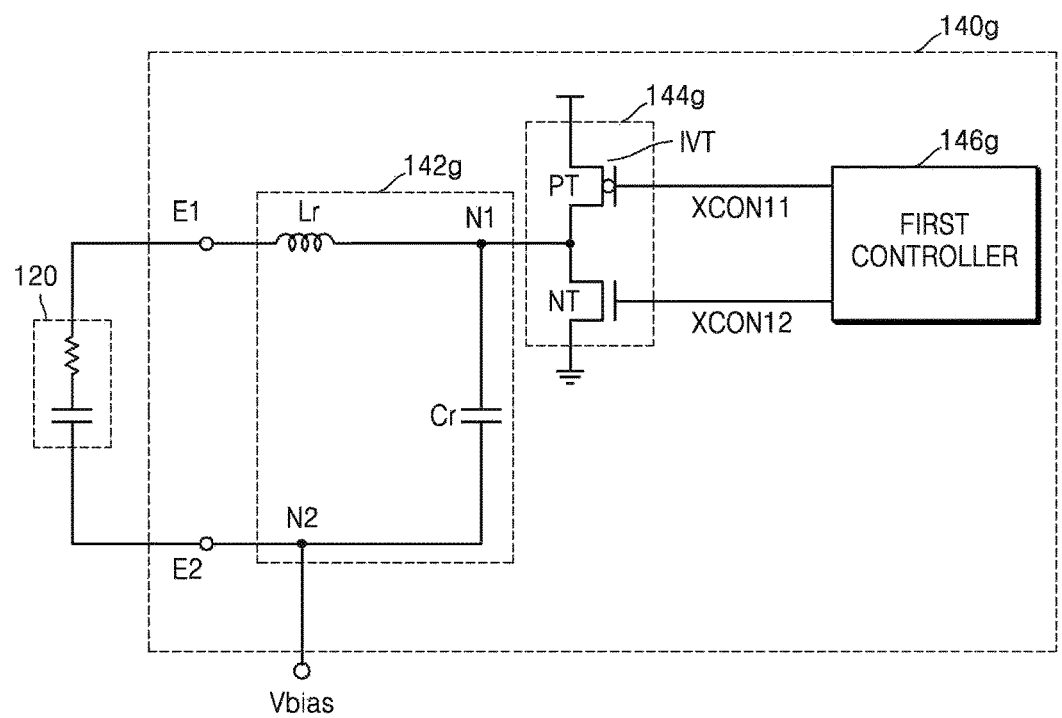
FIG. 16 is a diagram illustrating a shutter driver according to another exemplary embodiment.

FIG. 16 is a diagram illustrating a shutter driver 140g according to another exemplary embodiment.

Figure 17:
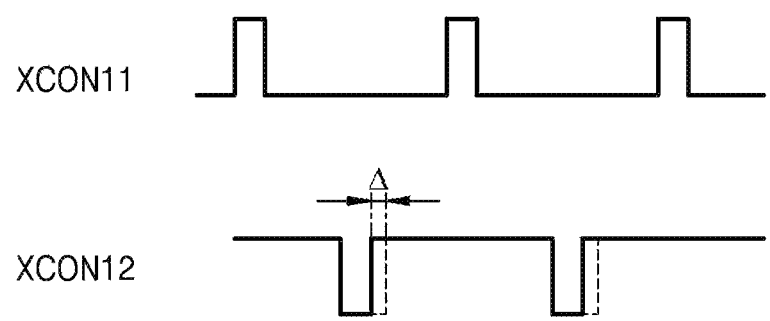
FIG. 17 is a diagram illustrating an operation of an exemplary shutter driver of FIG. 16.

Referring to FIG. 16, the shutter driver 140g may include a resonator 142g, a loss compensator 144g, and a first controller 146g. The resonator 142g, the loss compensator 144g, and the first controller 146g may be similar to the resonator 142b, the loss compensator 144b, and the first controller 146b of FIG. 8, respectively, and thus, detailed explanations thereof are omitted. However, a PMOS transistor PT and an NMOS transistor NT of an inverter IVT in the loss compensator 144g of FIG. 16 may be gated by control signals XCON11 and XCON12. For example, the PMOS transistor PT may be gated by the control signal XCON1, and the NMOS transistor NT may be gated by the control signal XCON12. The first controller 146g may vary duty ratios of the control signals XCON1 and XCON2 to apply them to the inverter IVT. For example, the first controller 146g may generate the control signals XCON1 and XCON2 so that the duty ratio of the control signal XCON12 gating the NMOS transistor NT is larger than that of the first control signal XCON11 gating the PMOS transistor PT, as shown in FIG. 17, to compensate for distortion of the driving voltage Vdrv or to generate an optimum driving voltage Vdrv in consideration of operating characteristics. The first controller 146g may detect the driving voltage Vdrv from terminals E1 and E2 and adjust the duty ratios of the first control signals XCON1 and XCON2.

In the example above, the shutter driver adjusts a duty ratio of a control signal by feeding the driving voltage Vdrv back to control the generation of the driving voltage Vdrv, has been described above. However, the disclosure is not limited thereto. The shutter driver, according to an exemplary embodiment, may adjust a duty ratio of a first control signal based on an operating environment of the 3D image sensor module 100. Furthermore, the shutter driver, according to an exemplary embodiment, may control an amount of energy (which is supplied to a resonator to generate the driving voltage Vdrv) or a voltage (i.e., power supply voltage) of a power supply terminal of a loss compensator, based on operating environment of the 3D image sensor module 100. These operations are described below.

Figure 18:
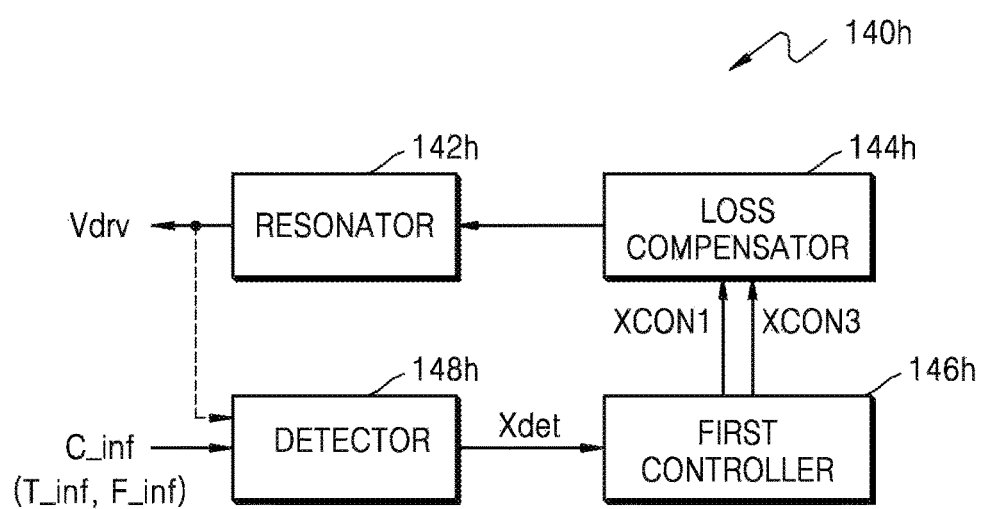
FIG. 18 is a block diagram of a shutter driver according to another exemplary embodiment.

FIG. 18 is a block diagram of a shutter driver 140h according to another exemplary embodiment.

Referring to FIG. 18, the shutter driver 140h may include a resonator 142h, a loss compensator 144h, and a first controller 146h. The resonator 142h, the loss compensator 144h, and the first controller 146h may be similar to those described above, and thus, detailed explanations thereof are omitted. The shutter driver 140h may further include a detector 148h. The detector 148h may feed the driving voltage Vdrv back, detect a voltage level or wavelength of the driving voltage Vdrv, and provide a detection result Xdet to the first controller 146h. For example, the first controller may include the active signal generator 146c_2 of FIG. 9A or the duty ratio controller 146e_2 of FIG. 13B, and may adjust a duty ratio of a first control signal XCON1 for controlling the generation of the driving voltage Vdrv, in response to the detection result Xdet, and apply the first control signal XCON1 having an adjusted duty ratio to the loss compensator 144h.

The detector 148h may also detect environmental information C_inf of the 3D image sensor module 100 and provide the detection result Xdet to the first controller 146h. For example, the environmental information C_inf may be temperature information T_inf or characteristic information F_inf of the 3D image sensor module 100. For example, the temperature information T_inf may be sensed by a temperature sensor which is included in the 3D image sensor module 100 or an electronic apparatus including the 3D image sensor module 100, and may be input to the detector 148h. In this case, when the temperature information T_inf is different from a reference value, the detector 148h may transmit a detection result Xdet, which corresponds to a difference between the temperature information T_inf and the reference value, to the first controller 146h. The first controller 146h may generate a third control signal XCON3 in response to the detection result Xdet. The loss compensator 144h may vary a voltage (i.e., power supply voltage) of a power supply terminal in response to the third control signal XCON3. Accordingly, a different driving voltage Vdrv may be set.

For example, when the third control signal XCON3 having a first logic level, which indicates that the temperature information T_inf is higher than a reference value, is applied to the loss compensator 144h, the loss compensator 144h may increase an energy supply to the resonator 142h. That is, by increasing the level of the power supply voltage of the loss compensator 144h, the amount of current that is supplied from the power supply terminal to a first node N1 may be increased. When the third control signal XCON3 having a second logic level, which indicates that the temperature information T_inf is lower than a reference value, is applied to the loss compensator 144h, the loss compensator 144h may decrease an energy supply to the resonator 142h. That is, by decreasing the level of the power supply voltage of the loss compensator 144h, the amount of current that is supplied from the power supply terminal to the first node N1 may be decreased. However, even when the temperature information T_inf is lower than the reference value, the loss compensator 144h may increase an energy supply to the resonator 142h according to operating characteristics of the 3D image sensor module 100.

The first controller 146h may generate the third control signal XCON3 based on characteristic information F_inf. The characteristic information F_inf may include information about characteristics of the 3D image sensor module 100 or an electronic apparatus including the 3D image sensor module 100. For example, operating characteristics may be different between 3D image sensor modules 100 having the same specification. For example, one of the 3D image sensor modules 100 having the same specification may most correctly generate the optical modulation signals MLIT# or image data IMG (refer to FIG. 1) when the driving voltage Vdrv has a first value, whereas another one of the 3D image sensor modules 100 having the same specification may correctly generate the optical modulation signals MLIT# or the image data IMG when the driving voltage Vdrv has a second value. The third control signal XCON3 may be generated so that an optimum operation environment is obtained, in response to the characteristic information F_inf indicating operating characteristics of each 3D image sensor module 100. The loss compensator 144h may increase or decrease an energy supply to the resonator 132h as described above, in response to the third control signal XCON3.

Although in shutter driver 140h according to an exemplary embodiment an energy supply to the resonator 142h is changed by controlling a power supply voltage level of the loss compensator 144h based on the environmental information C_inf, the disclosure is not limited thereto. The shutter driver 140h according to an exemplary embodiment may compensate distortion of the driving voltage Vdrv while decreasing power consumption required for generating the driving voltage Vdrv by performing an adjustment of the duty ratio based on the environmental information C_inf.

Figure 19:
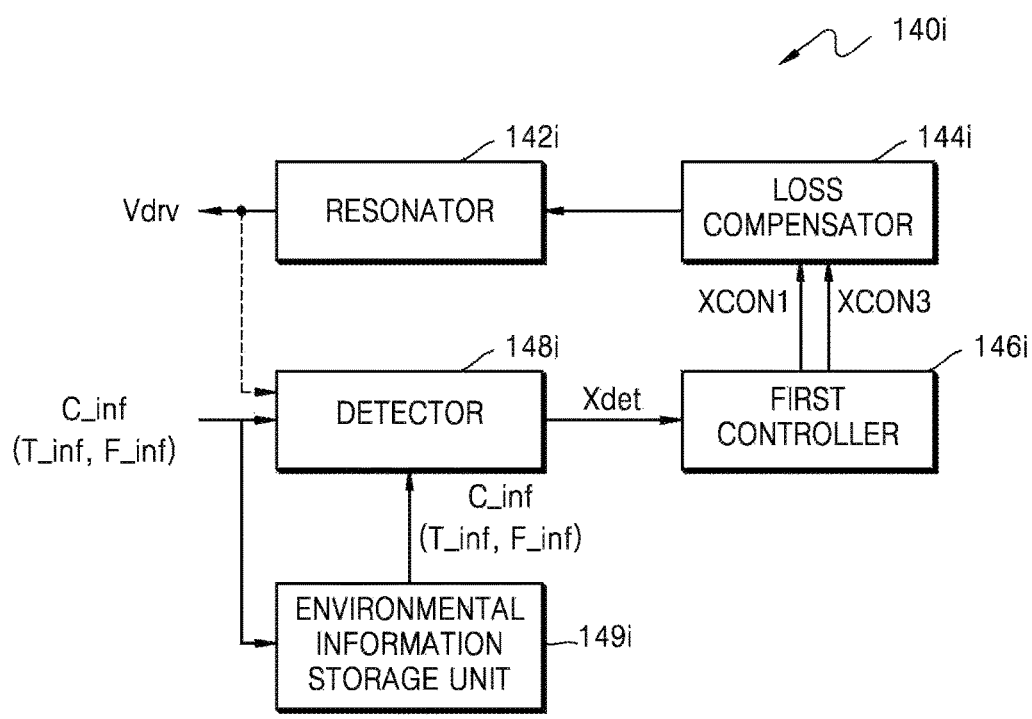
FIG. 19 is a block diagram of a shutter driver according to another exemplary embodiment.

FIG. 19 is a block diagram of a shutter driver 140i according to another exemplary embodiment.

Referring to FIG. 19, the shutter driver 140i may include a resonator 142i, a loss compensator 144i, a first controller 146i, and a detector 148i, similar to the shutter driver 140h of FIG. 18. The shutter driver 140i may further include an environmental information storage unit 149i for storing environmental information C_inf. For example, after temperature information T_inf of the environmental information C_inf is sensed in a first period and then stored in the environmental information storage unit 149i, the temperature information T_inf stored in the environmental information storage unit 149i may be transmitted to the detector 148i in a second period or by a request of the detector 148i. The second period may be equal to or different from the first period. Characteristic information F_inf of the environmental information C_inf may be stored in the environmental information storage unit 149i as trim information during the production of the 3D image sensor module.

Although the detector 148i and the environmental information storage unit 149i are included in shutter driver 140i, the disclosure is not limited thereto. For example, the detector 148i and the environmental information storage unit 149i may be included in the 3D image sensor module 100 or an electronic apparatus including the 3D image sensor module 100, outside the shutter driver 140i. The environmental information C_inf may also be information for control that is required for the generation of the driving voltage Vdrv in an operation of the 3D image sensor module 100 or an electronic apparatus including the 3D image sensor module 100, other than the temperature information T_inf and the characteristic information F_inf. For example, the environmental information C_inf may be set differently according to applications using the 3D image sensor module 100, and thus, a driving voltage Vdrv optimized for the differently set environmental information C_inf may be generated.

Figure 20:
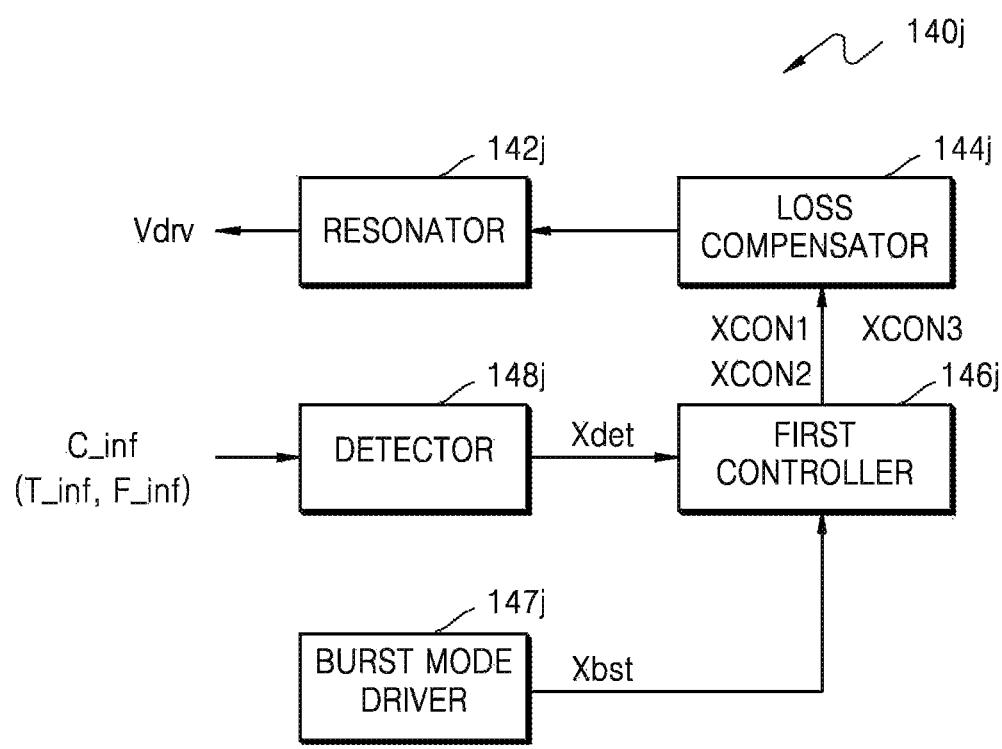
FIG. 20 is a block diagram of a shutter driver according to another exemplary embodiment.

FIG. 20 is a block diagram of a shutter driver 140*j* according to another exemplary embodiment.

Referring to FIG. 20, the shutter driver 140*j* may include a resonator 142*j*, a loss compensator 144*j*, a first controller 146*j*, and a detector 148*j*, similar to the shutter driver 140*h* of FIG. 18. The shutter driver 140*j* may further include a burst mode driver 147*j*. The burst mode driver 147*j* may perform similarly to the burst mode driver 147*h* of FIG. 14.

Figure 21:
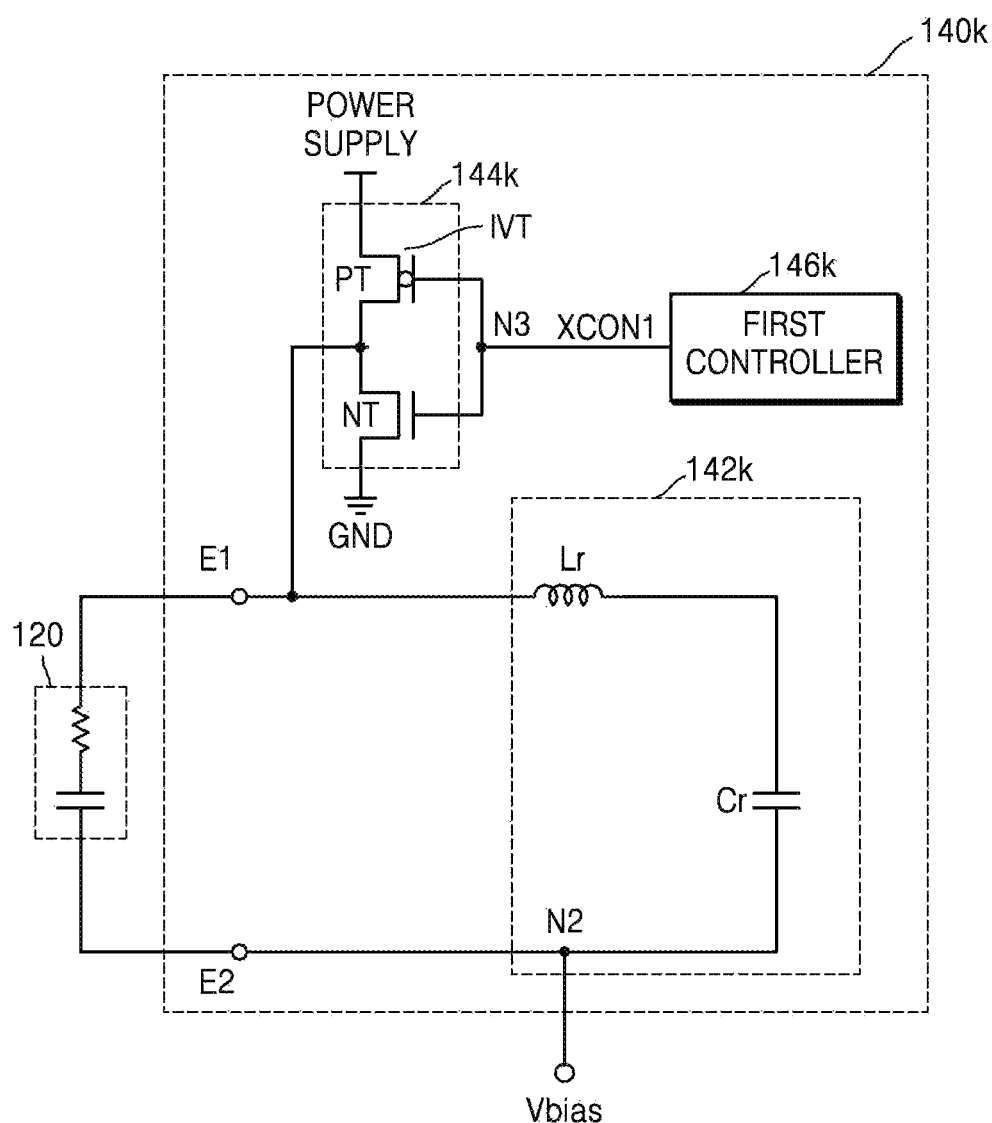
FIG. 21 is a diagram illustrating a shutter driver according to another exemplary embodiment.

FIG. 21 is a diagram illustrating a shutter driver 140*k* according to another exemplary embodiment.

Referring to FIG. 21, the shutter driver 140*k* may include a resonator 142*k*, a loss compensator 144*k*, and a first controller 146*kj*, similarly to the shutter driver 140*b* of FIG. 8. While the output terminal of the loss compensator 144*b* of FIG. 8 is connected to the first node N1 to adjust a node voltage of the first node N1, the output terminal of the loss compensator 144*k* of FIG. 21 is connected to a terminal E1.

The cases in which a shutter driver, which generates the driving voltage Vdrv by using a sine wave biased with a first bias voltage from a loss-compensated recycling energy, includes a resonator including an inductor and a capacitor, have been described above. However, the disclosure is not limited thereto. A shutter driver according to another exemplary embodiment may generate the driving voltage Vdrv by using a characteristic included in a circuit itself, other than a capacitor. This operation is explained below.

Figure 22A:
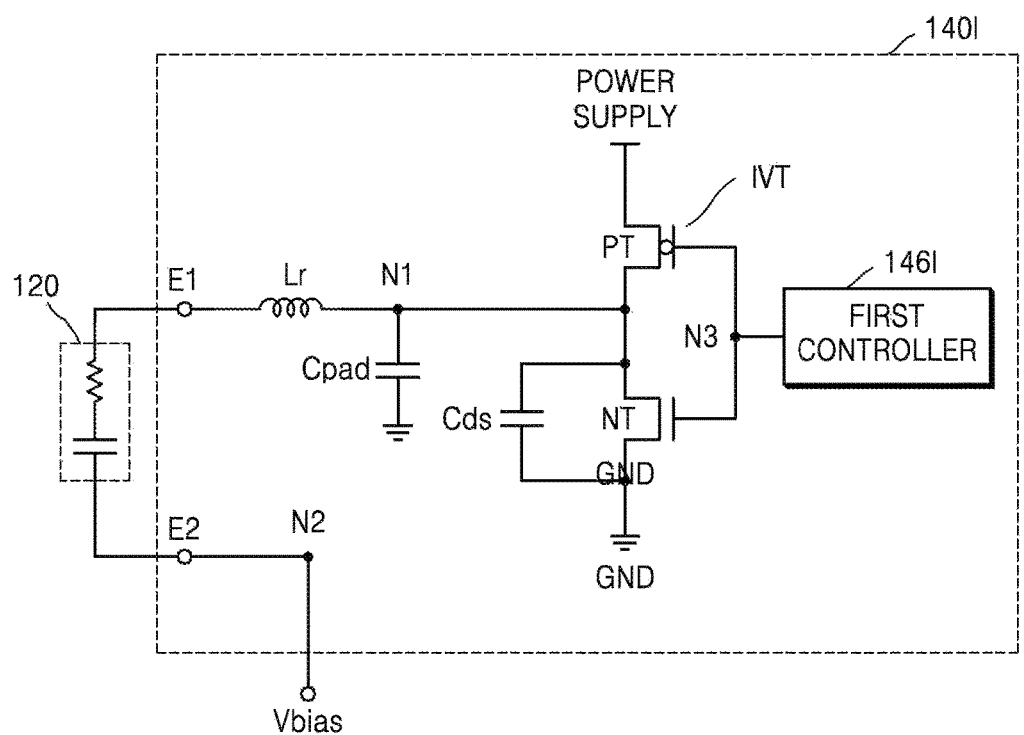
FIG. 22A is a diagram illustrating a shutter driver according to another exemplary embodiment.
Figure 22B:
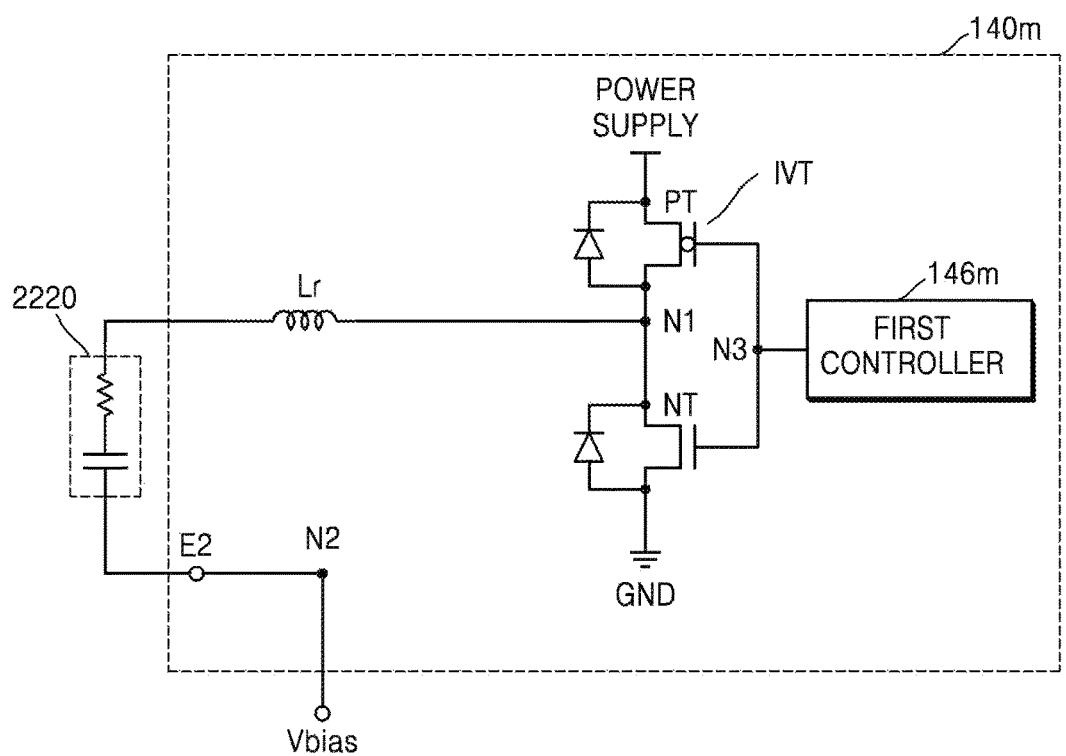
FIG. 22B is a diagram illustrating a shutter driver according to another exemplary embodiment.

FIG. 22A is a diagram illustrating a shutter driver 140*l* according to another exemplary embodiment, and FIG. 22B is a diagram illustrating a shutter driver 140*m* according to another exemplary embodiment.

Referring to FIG. 22A, the shutter driver 140*l* includes an inductor Lr having one end connected to a terminal E1 and the other end connected to a first node N1, an inverter IVT having an output terminal connected to the first node N1, and a first controller 146*l* for controlling the gates of PMOS and NMOS transistors PT and NT included in the inverter IVT. Since an operation of the inverter IVT and an operation of the first controller 146*l* may be as described above, detailed descriptions thereof are omitted. The shutter driver 140*l* of FIG. 22A may perform energy exchange with an optical shutter 120 by using a parasitic capacitor without including a capacitor for resonance, unlike the shutter drivers described above. For example, the shutter driver of FIG. 22A may perform the function of the capacitor Cr of the above-described resonator by using parasitic capacitance Cpad between the first node N1 and a pad or parasitic capacitance Cds between both ends of the NMOS transistors NT.

When the inverter IVT is implemented with transistors PT and NT with built-in diodes applied thereto, as shown in FIG. 22B, power consumption that is required for the generation of the driving voltage Vdrv may be reduced due to the formation of a current path through the built-in diodes. The shutter drivers 140*l* and 140*m* of FIGS. 22A and 22B may also detect a driving voltage Vdrv between a terminal E1 and a terminal E2, like the shutter driver 140*c* of FIG. 9A, and may perform control optimized for the generation of the driving voltage Vdrv.

Referring back to FIG. 1, the image generator 160 processes the at least two optical modulation signals MLIT# that are output from the optical shutter 120. The image generator 160 generates the image data IMG for a subject, which may include depth information D_inf calculated based on a phase difference between the at least two optical modulation signals MLIT#. For example, as shown in FIG. 4, after the image generator 160 processes four optical modulation signals MLIT# phase-modulated with 0 degrees, 90 degrees, 180 degrees, and 270 degrees as four frames, the image generator 160 calculates the four frames according to a depth image generation algorithm to thereby generate one frame (or image) including the depth information D_inf. Since a shutter driver according to any one or more exemplary embodiments described above compensates distortion while reducing power that is required for the generation of a driving voltage, or generates a driving voltage optimized for operating characteristics, the image generator 160 may generate accurate image data IMG. The image generator 160 may include an image sensor and an image processor, which will be explained later.

Figure 23:
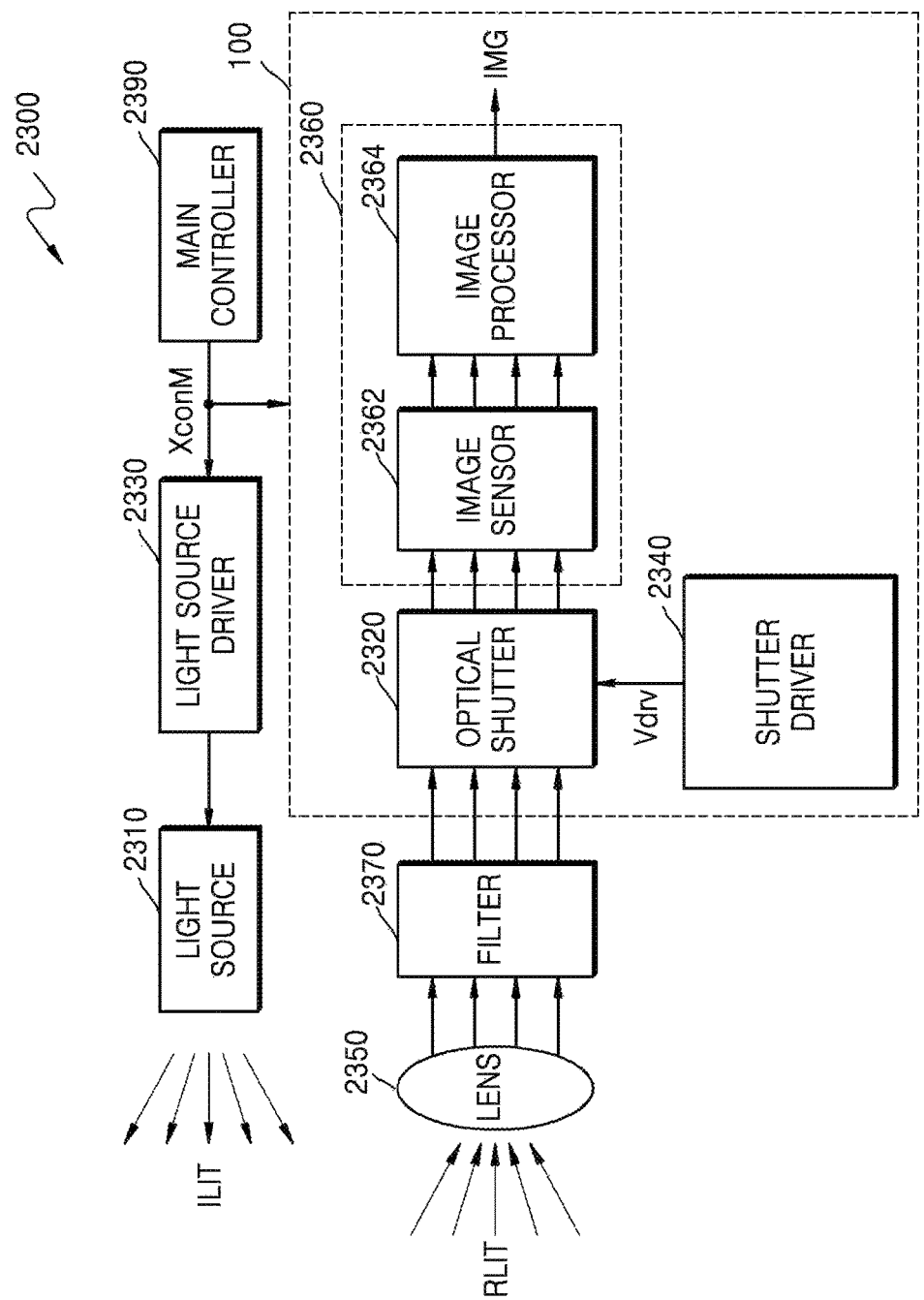
FIG. 23 is a block diagram of an electronic apparatus according to an exemplary embodiment.

FIG. 23 is a block diagram of an electronic apparatus including an image sensor module, according to an exemplary embodiment.

Referring to FIG. 23, the electronic apparatus 2300 may include a light source 2310 for generating light having a predetermined wavelength, a light source driver 2330 for driving the light source 2310, a 3D image sensor module 100 including an optical shutter 2320, a shutter driver 2340, and an image generator 2360, and a main controller 2390 for generating a main control signal XconM controlling an operation of the light source driver 2330 and an operation of the 3D image sensor module 100. The main controller 2390 may perform various control operations that may be required for an operation of the shutter driver 2340. Also, the electronic apparatus 2300 may further include a lens 2350 for focusing reflective light RLIT on an area of the optical shutter 2320 and a filter 2370 for transmitting only light having a predetermined wavelength and removing background light or miscellaneous light. A second lens for focusing an optical modulated signal on an area of the image sensor 2326 in the image generator 2360 may further be disposed between the optical shutter 2320 and the image generator 2360.

For example, the light source 2310 may be a light-emitting diode (LED) or a laser diode (LD) that may emit light having a near-infrared ray (NIR) wavelength of about 850 nm which is not visible to the human eye, for safety's sake, but a bandwidth of wavelength and a type of light source are not limited. The light source driver 2330 may drive the light source 2310 by using an amplitude modulation or phase modulation method, according to the main control signal XconM received from the main controller 2390. Depending on a driving signal of the light source driver 2330, incident light ILIT that radiates from the light source 2310 to a subject may have a form of a periodic continuous function having a predetermined period. For example, the incident light ILIT may be generated as illustrated in FIG. 4.

The 3D image sensor module 100 including an optical shutter 2320, a shutter driver 2340, and an image generator 2360, may perform an operation as described above. The image generator 2360 may include an image sensor 2362 and an image processor 2364 and may generate the image data IMG described above. However, the image generator 2360 of the 3D image sensor module 100 may include only the image sensor 2362, and the image processor 2364 may be disposed outside the 3D image sensor module 100. The image sensor 2362 may be implemented with a CMOS image sensor (CIS) or the like. The image sensor 2362 may sense a plurality of optical modulation signals MLIT# and output the sensed optical modulation signals by units of frames. As described above, each of the plurality of optical modulation signals MLIT# may be processed for separate frames. The image processor 2364 may generate the image data IMG including depth image D_inf from a frame corresponding to each optical modulation signal MLIT#.

Figure 24:
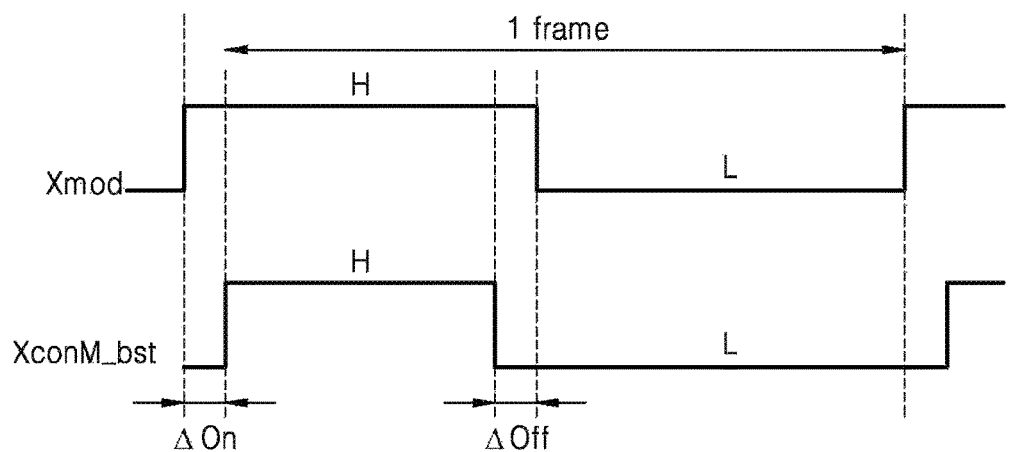
FIG. 24 illustrates a mode signal and a burst control signal that are used for a burst mode operation in an exemplary electronic apparatus of FIG. 23.

The electronic apparatus 2300 may also operate in the burst mode described above. FIG. 24 shows a mode signal Xmod and a burst control signal XconM_bst that may be used for a burst mode operation in the electronic apparatus 2300 of FIG. 23. Referring to FIG. 24, in a burst mode, the main controller 2390 may set the mode signal Xmod, which is applied to the shutter driver 2340 and directs the burst mode, and the burst control signal XconM_bst, which is applied to the light source 2310, so that a period of a logic high (H) level of the burst control signal XconM_bst is narrower than a period of a logic high (H) level of the mode signal Xmod. That is, an on-delay ΔOn may be applied to the burst mode control signal XconM_bst after the mode signal Xmod transitions to a logic high (H), and an off-delay ΔOff may be applied to the burst mode control signal XconM_bst before the mode signal Xmod transitions to a logic low (L). Accordingly, when the electronic apparatus 2300 operates in a burst mode, a calculation error of the depth information D_inf, which may occur due to a transition period of the optical shutter 2320, may be reduced. Although not illustrated in the electronic apparatus 2300 of FIG. 23, the electronic apparatus 2300 may further include a temperature sensor or a characteristic information storage unit.

Figure 25:
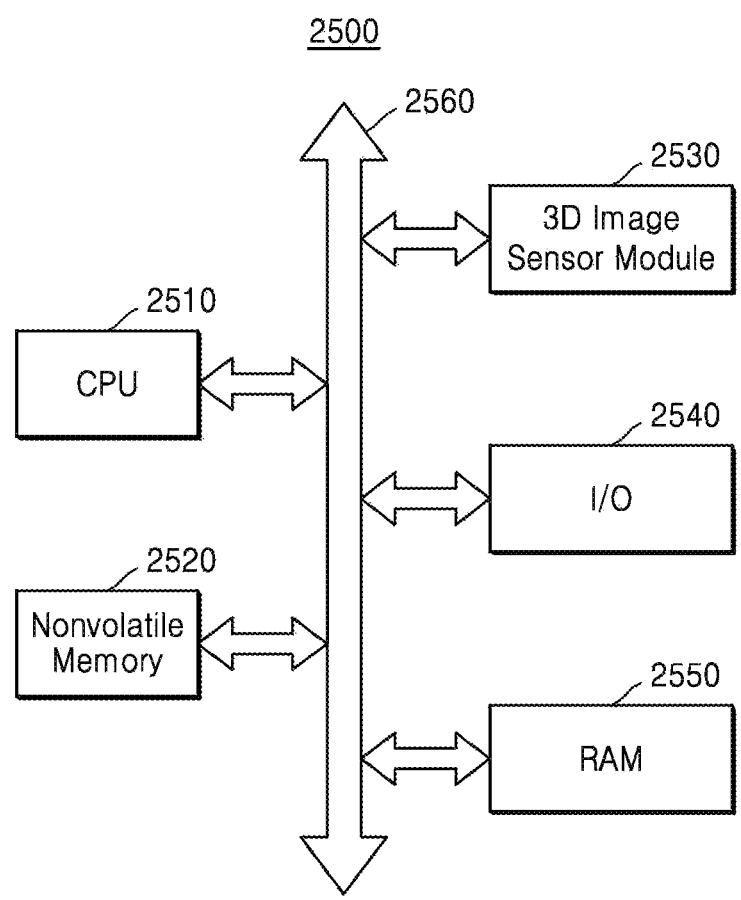
FIG. 25 is a block diagram of an electronic apparatus according to another exemplary embodiment.

FIG. 25 is a block diagram of an electronic apparatus 2500 according to another exemplary embodiment.

The electronic apparatus 2500 of FIG. 25 may include a central processing unit (or processor) 2510, a nonvolatile memory 2520, a 3D image sensor module 2530, an input/output (I/O) device 2540, and a random access memory (RAM) 2550. The central processing unit 2510 may communicate with the nonvolatile memory 2520, the 3D image sensor module 2530, the I/O device 2540, and the RAM 2550 via a bus 2560. The 3D image sensor module may be implemented as an independent semiconductor chip or may be integrated with the central processing unit 2510 to thereby implement a single semiconductor chip. The 3D image sensor module 2530 of the electronic apparatus illustrated in FIG. 25 may reduce power consumption by using a driving voltage of an optical shutter using a distortion-compensated energy as described above or may generate accurate image data while reducing power consumption.

Figure 26:
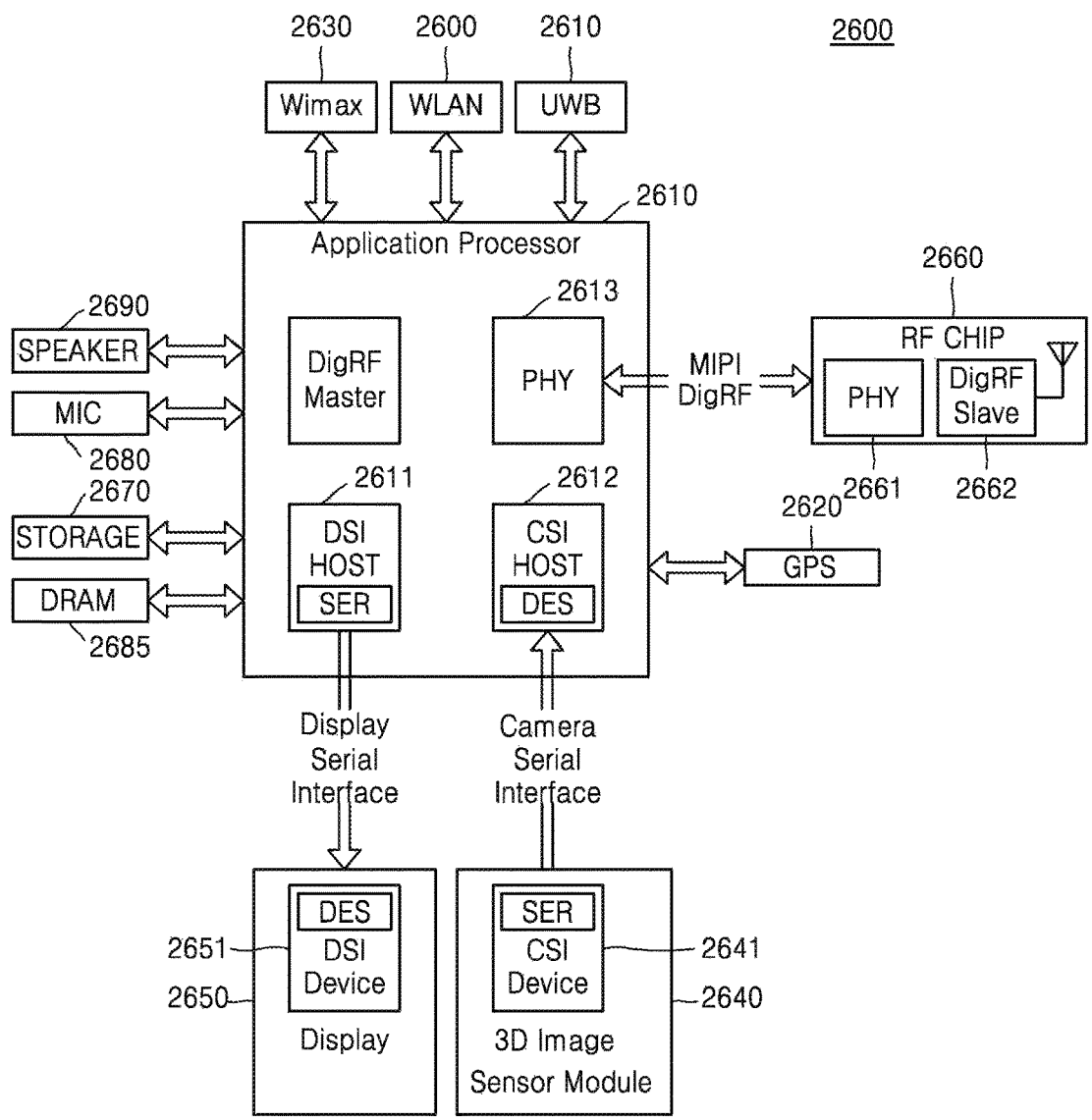
FIG. 26 is a block diagram of an electronic apparatus according to another exemplary embodiment.

FIG. 26 is a block diagram of an electronic apparatus 2600 according to another exemplary embodiment.

Referring to FIG. 26, the electronic apparatus 2600 may be a data processing apparatus that may use or support a mobile industry processor interface (MIPI), for example, a mobile phone, a personal digital assistant (PDA), a portable multimedia player (PMP), or a smart phone. The electronic apparatus 2600 may include an application processor 2610, a 3D image sensor module 2640, and a display 2650.

A camera serial interface (CSI) host 2612 implemented in the application processor 2610 may serially communicate with a CSI apparatus 2641 of the 3D image sensor module 2640 through a CSI. In this case, an optical deserializer (DES) may be implemented in the CSI host 2612, and an optical serializer may be implemented in the CSI apparatus 2641. A display serial interface (DSI) host 2611 implemented in the application processor 2610 may serially communicate with a DSI apparatus 2651 of the display 2650. In this case, an optical serializer may be implemented in the DSI host 2611, and an optical deserializer may be implemented in the DSI apparatus 2651.

The electronic apparatus 2600 may further include a radio frequency (RF) chip 2660 that may communicate with the application processor 2610. A physical layer protocol (PHY) 2613 of the electronic apparatus 2600 and a PHY 2661 of the RF chip 2660 may send data to or receive data from each other according to MIPI DigRF. The electronic apparatus 2600 may further include a global positioning system (GPS) 2620, a storage 2670, a microphone 2680, a dynamic random access memory (DRAM) 2685, and a speaker 2690. The electronic apparatus 2600 may communicate by using a Wimax 2630, a wireless local area network (WLAN) 3100, and a ultra-wideband (UWB) 3110.

An electronic apparatus according to one or more above exemplary embodiments may be one of various electronic apparatuses, such as a TV, a smart phone, a camera, a tablet PC, a game console, and a wearable device. Furthermore, the electronic apparatus according to one or more above exemplary embodiments may measure a distance to an object as an industrial measuring apparatus.

According to a 3D image sensor module according to one or more above exemplary embodiments and an electronic apparatus including the 3D image sensor module, a driving voltage, which is used when an optical shutter modulates light that is reflected from a subject, may be generated from a loss-compensated recycling energy, and thus, power consumption may be reduced.

According to a 3D image sensor module according to one or more above exemplary embodiments and an electronic apparatus including the 3D image sensor module, the driving voltage may be generated through an operation of a burst mode, and thus power consumption may be further reduced.

According to a 3D image sensor module according to one or more above exemplary embodiments and an electronic apparatus including the 3D image sensor module, a duty ratio of a control signal for the generation of the driving voltage may be adjusted, and thus, distortion of the driving voltage may be compensated and power consumption may also be reduced.

According to a 3D image sensor module according to one or more above exemplary embodiments and an electronic apparatus including the 3D image sensor module, a battery issue or a heat protection issue is minimized since power consumption is reduced, and thus, the 3D image sensor module and the electronic apparatus may be formed in a smaller size or in a mobile type.

According to a 3D image sensor module according to one or more above exemplary embodiments and an electronic apparatus including the 3D image sensor module, an accurate 3D image may be generated, and thus, an accurate distance may be measured.

It should be understood that the one or more exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the disclosure as defined by the following claims.

What is claimed is:

1. A three-dimensional (3D) image sensor device comprising:
   an optical shutter configured to vary a transmittance of reflective light reflected from a subject, according to a driving voltage of a sine wave biased with a first bias voltage, and modulate the reflective light to generate at least two optical modulation signals having different phases;
   a shutter driver configured to generate the driving voltage through an energy exchange between an LC resonant circuit and the optical shutter, and provide the driving voltage to the optical shutter; and
   an image sensor configured to output at least two electrical signals, each of which correspond to the at least two optical modulation signals, by units of frames.

2. The 3D image sensor device of claim 1, wherein the shutter driver comprises:
   a loss compensator configured to provide energy to the LC resonant circuit to compensate for energy lost during the energy exchange between the LC resonant circuit and the optical shutter; and
   a first controller configured to control at least one selected from an amount of energy provided to the LC resonant circuit by the loss compensator, and a time taken by the loss compensator to provide the energy to the LC resonant circuit.

3. The 3D image sensor device of claim 2, wherein the loss compensator comprises at least one inverter that is gated by a first control signal input from the first controller and is configured to provide energy to a first node electrically connected to the LC resonant circuit.

4. The 3D image sensor device of claim 3, further comprising a detector configured to provide a detection result to the shutter driver corresponding to environmental information of the 3D image sensor device,
   wherein the shutter driver is configured to, in response to receiving the detection result, adjust a duty ratio of the first control signal and a level of a power supply voltage of the shutter driver.

5. The 3D image sensor device of claim 1, further comprising a burst mode driver configured to output a burst signal for directing an operation of a burst mode,
   wherein the shutter driver is configured to, in response to receiving the burst signal, not generate the driving voltage in a period corresponding to a portion of the frame.

* * * * *